US011423361B2

(12) United States Patent
Al-Suhaimi

(10) Patent No.: US 11,423,361 B2
(45) Date of Patent: Aug. 23, 2022

(54) SYSTEM FOR ENHANCING ON-CAMPUS COMMUNICATIONS THROUGH VECTOR CORRELATION QUANTIFICATION FOR EMPLOYEE REQUEST SUBMISSIONS

(71) Applicant: Imam Abdulrahman Bin Faisal University, Dammam (SA)

(72) Inventor: Ebtesam Abdullah Al-Suhaimi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 945 days.

(21) Appl. No.: 15/598,092

(22) Filed: May 17, 2017

(65) Prior Publication Data

US 2018/0336523 A1  Nov. 22, 2018

(51) Int. Cl.
*G06Q 10/10* (2012.01)
(52) U.S. Cl.
CPC ................. *G06Q 10/105* (2013.01)
(58) Field of Classification Search
CPC ..................................................... G06Q 10/105
See application file for complete search history.

(56) References Cited

U.S. PATENT DOCUMENTS

| 8,751,408 B2 | 6/2014 | Linton et al. |
| 2007/0072618 A1* | 3/2007 | Freytsis .............. H04L 67/1002 455/452.2 |

(Continued)

FOREIGN PATENT DOCUMENTS

| CN | 104346766 | 2/2015 |
| WO | WO-0227605 A1 * | 4/2002 ............. G06Q 10/06 |

OTHER PUBLICATIONS

Jun Yan, Yun Yang and G. K. Raikundalia, "SwinDeW-a p2p-based decentralized workflow management system,", [online] Sep. 2006, [retrieved on Jun. 6, 2022], Retrieved from the Internet:< https://ieeexplore.ieee.org/abstr (Year: 2006).*

(Continued)

*Primary Examiner* — Lynda Jasmin
*Assistant Examiner* — Ehrin L Pratt
(74) *Attorney, Agent, or Firm* — Oblon, McClelland, Maier & Neustadt, L.L.P.

(57) ABSTRACT

Systems and methods for determining an amount of correlation between non-orthogonal vectors characterizing quantified employee request submissions include generating a prioritization matrix for a request submission including entries associated with characteristics of the request submission considered important by one or more approvers; generating a request attribute vector characterizing attributes of a request extracted from the request submission; calculating a product for each entry of the prioritization matrix by multiplying corresponding entries of the prioritization matrix and the request attribute vector; applying a weighting factor to the product for each entry of the prioritization matrix resulting in weighted products for each entry of the prioritization matrix; accumulating the weighted products into a request quality score indicating an amount of correlation between the prioritization matrix and the request attribute vector; and transmitting an enhanced data packet to another computing device including the request attribute vector, prioritization matrix, or request quality score.

17 Claims, 19 Drawing Sheets

(56) References Cited

U.S. PATENT DOCUMENTS

| | | | | |
|---|---|---|---|---|
| 2013/0084878 A1* | 4/2013 | Chen | .................... | H04W 72/10 |
| | | | | 455/452.1 |
| 2014/0162582 A1* | 6/2014 | Daly | ................ | H04W 28/0289 |
| | | | | 455/404.1 |
| 2016/0092267 A1* | 3/2016 | Boyacigiller | ...... | G06Q 10/0633 |
| | | | | 718/103 |
| 2017/0236081 A1* | 8/2017 | Grady Smith | ....... | G06Q 10/067 |
| | | | | 705/7.36 |

OTHER PUBLICATIONS

"New Procedure for Professional Development Conference Request," Los Medanos College, Jan. 13, 2011, 3 Pages www.losmedanos.edu.

Anup Kumar Ghosh, et al., "A Conceptual Framework of Faculty Performance Evaluation," Asian Journal of Management Research, 2010, pp. 217-229.

* cited by examiner

300

Request Submission

302 — Neurology Research Award 99999999 Request

304 — Biographical Information
- Name
- Gender
- Job Title
- Number of years at university
- Number of years in profession
- Research/teaching focus area 306 — Historical Information
- # of requests submitted in past year of same type
- # of requests submitted in past year (all types)
- # of requests submitted ever of same type
- # of requests submitted ever (all types)
- Previous performance review score
- Average performance review score 308 — Other Information
- Community Service
- Extracurricular Activities
- Personal Statement 310 — Attach additional documentation here Submit — 512

1202 | Neurology 99999999 | Cardiology 11111111 | Biomedical 22222222 |

Neurology Research Award 99999999

1204 Previous requests for selected requester:
- Research Funding Request- 2012
- Promotion Request- 2013
- Teaching Award- 2014
- Research Funding Request- 2015
- Publication Request- 2016

1206 Requesters

| Faculty ID | Name | RQS |
|---|---|---|
| 1030028 | XXXXX1 | 100 |
| 1050029 | XXXXX2 | 93 |
| 1070030 | XXXXX3 | 87 |
| 1650032 | XXXXX4 | 80 |
| 1670033 | XXXXX5 | 79 |
| 1710035 | XXXXX6 | 75 |

1208

1212 Previous Decision Statistics:
- Select Year
- Select Request Type
- Additional Detail 1
- Additional Detail 2
- Additional Detail 3
- View Results 1210 Faculty member 1070030:
Click to see request details
Approve Request? Yes / No
Funding Amount (if applicable) $$$$

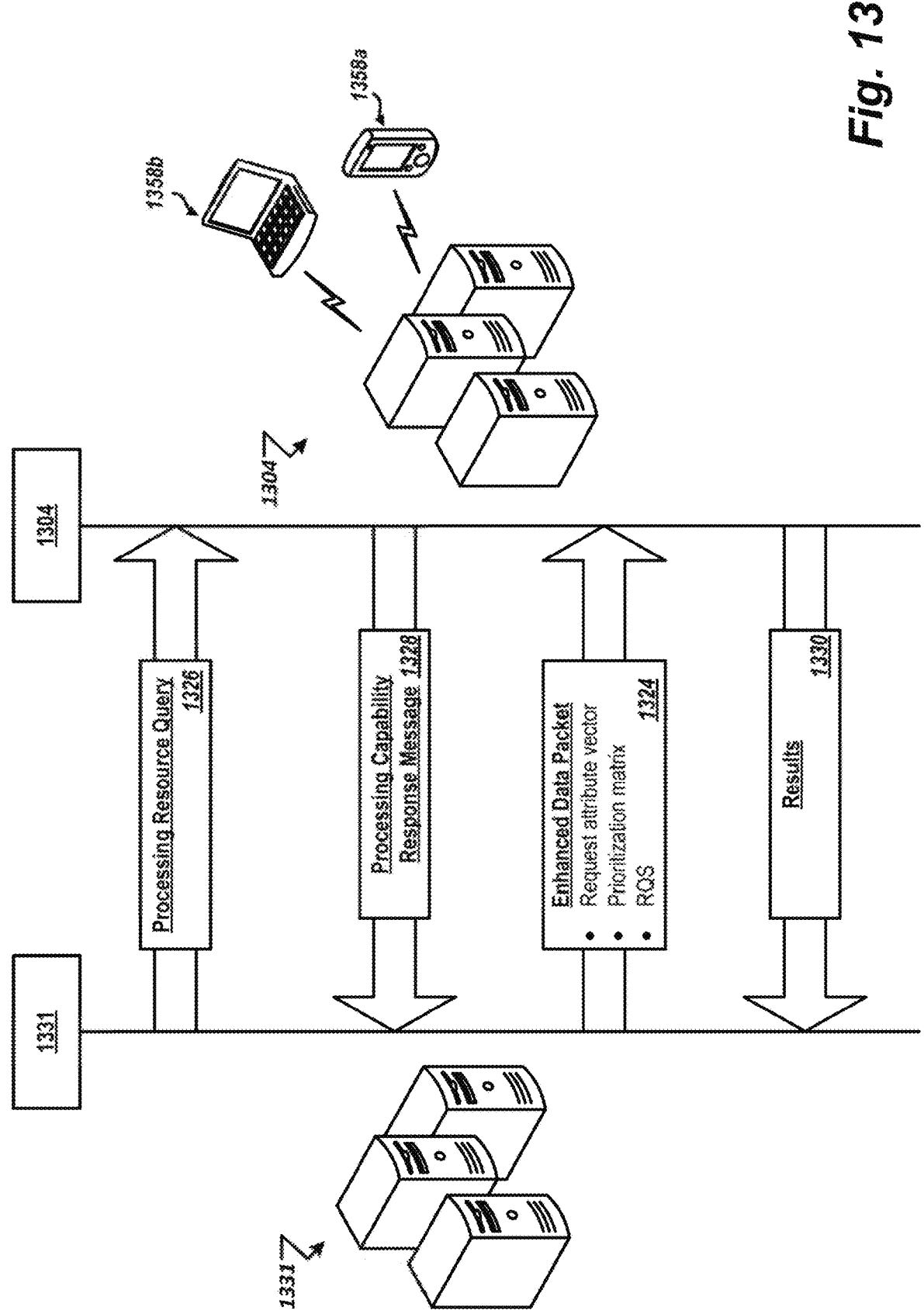

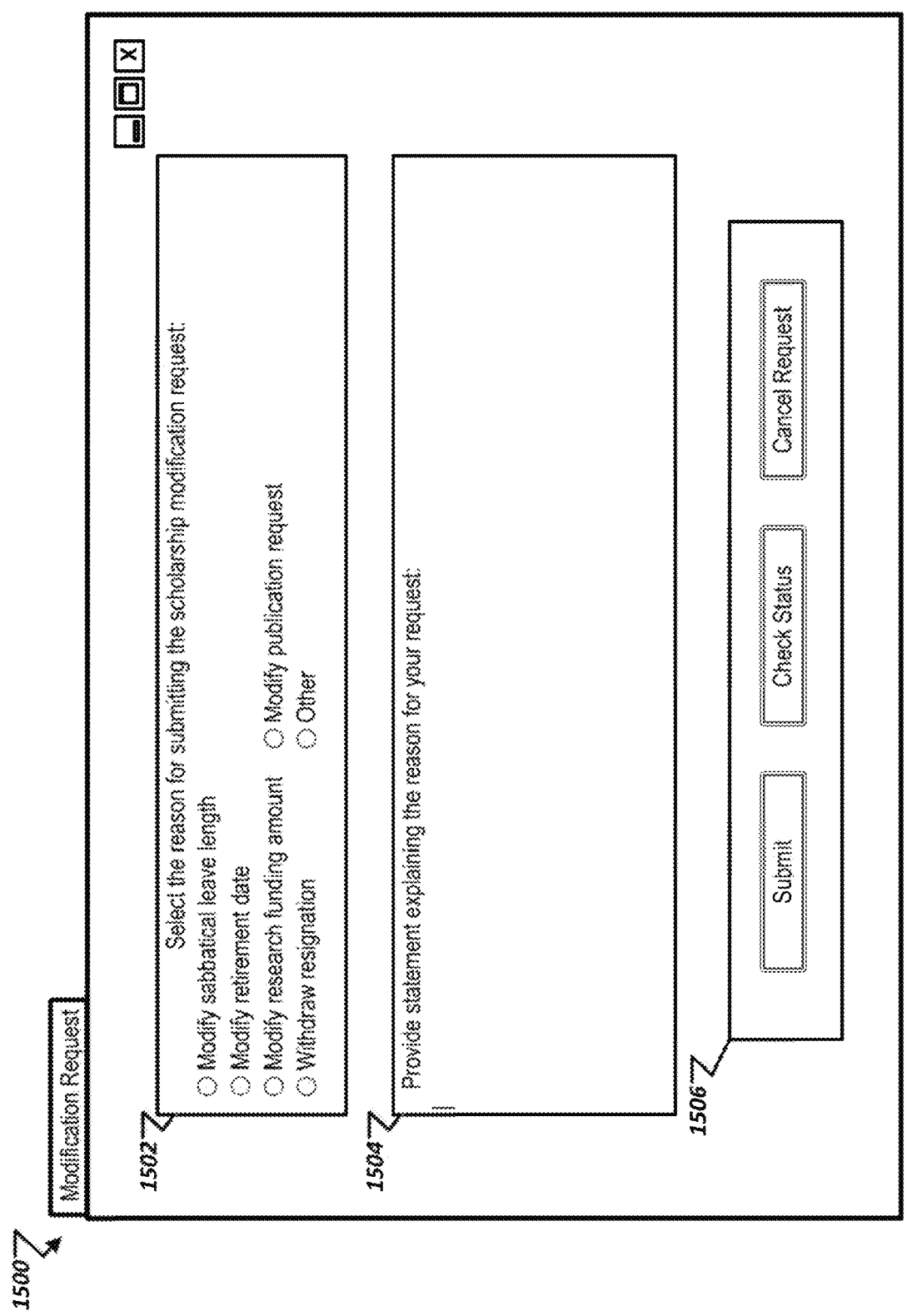

US 11,423,361 B2

SYSTEM FOR ENHANCING ON-CAMPUS COMMUNICATIONS THROUGH VECTOR CORRELATION QUANTIFICATION FOR EMPLOYEE REQUEST SUBMISSIONS

BACKGROUND

Institutions which large numbers of employees, such as universities that have hundreds or thousands of faculty members, are often under a large administration burden when it comes to processing and approving or disapproving employee requests. In some cases, thousands of requests can be submitted within a very short period of time, which makes adequately reviewing the requests and making decisions in a timely fashion very difficult. As recognized by the present inventors, passing data for faculty identification and request submissions can bog down computer networks across a university campus during high-volume and time-intense request submission periods. Also, in dynamic technological industries, economic, government, and university priorities can be constantly changing, which also makes determining whether or not to approve various faculty requests difficult.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

The implementations described herein are directed toward systems for enhancing on-campus communications through vector correlation quantification for employee request submissions. Also described are systems and methods for determining an amount of correlation between non-orthogonal vectors characterizing quantified employee request submissions including generating a prioritization matrix for a request submission including entries associated with characteristics of the request submission considered important by one or more approvers; generating a request attribute vector characterizing attributes of a request extracted from the request submission; calculating a product for each entry of the prioritization matrix by multiplying corresponding entries of the prioritization matrix and the request attribute vector, applying a weighting factor to the product for each entry of the prioritization matrix resulting in weighted products for each entry of the prioritization matrix; accumulating the weighted products into a request quality score indicating an amount of correlation between the prioritization matrix and the request attribute vector, and transmitting an enhanced data packet to another computing device including the request attribute vector, prioritization matrix, or request quality score.

BRIEF DESCRIPTION OF THE FIGURES

FIG. 3 illustrates a screenshot of a request user interface screen;
FIG. 12 illustrates a screenshot of a approver user interface screen;
FIG. 13 is an exemplary illustration of a portion of the request management environment;
FIG. 15 illustrates a screenshot of a modification request user interface screen.

DETAILED DESCRIPTION

Figure 1:
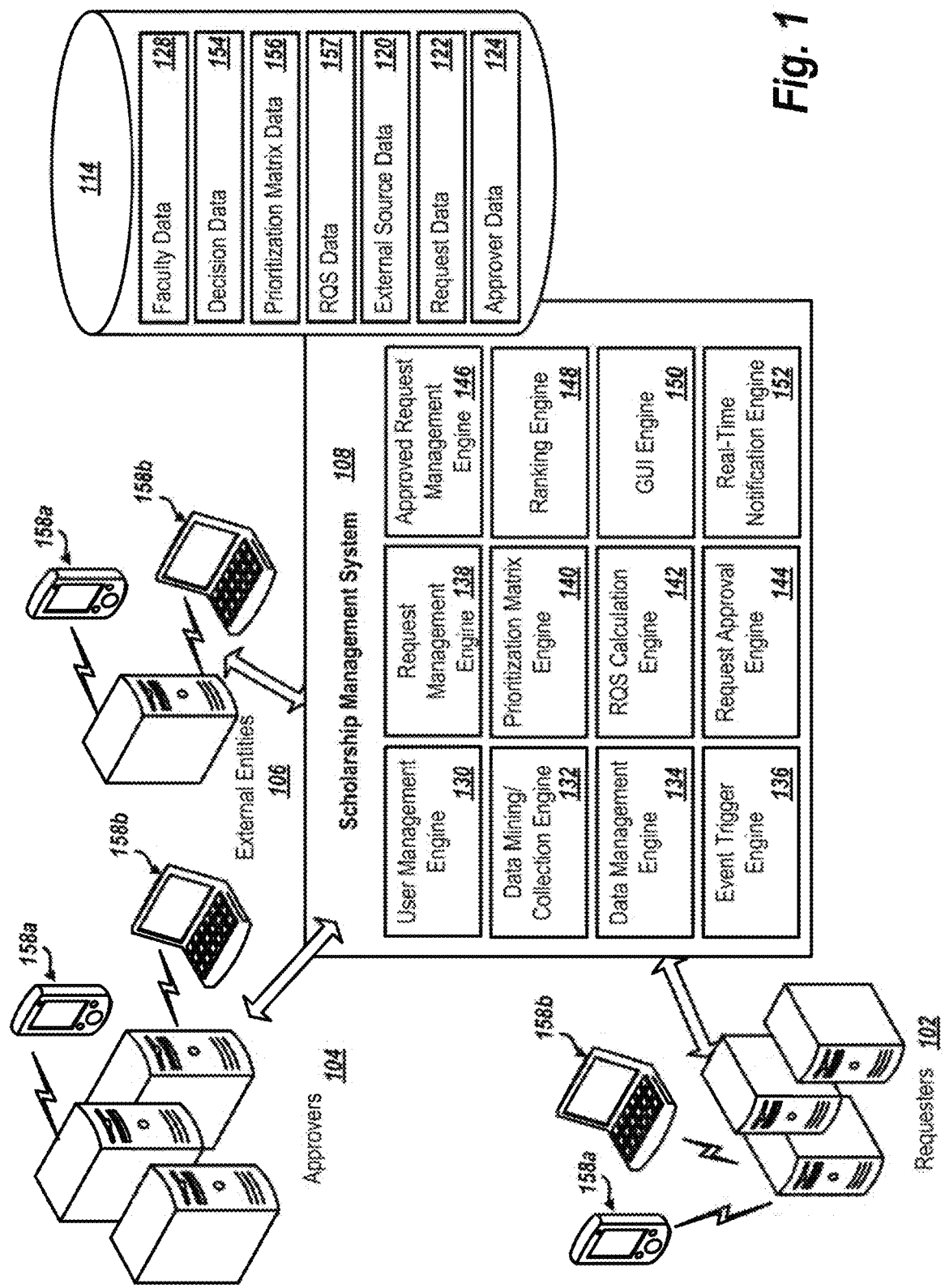
FIG. 1 is a diagram of an example environment for a request management system.

FIG. 1 is a diagram of an example environment 100 for a request management system 108, which manages requests submitted by employees, such as researchers or professors at a university. The diagram illustrates a series of interactions between one or more participants and the request management system 108 which receives requests from requesters 102, determines priorities for approving the requests based on national, economic, and/or university interests, ranks the requesters 102 based on an amount of correlation between the requesters 102 and the priorities, and determines a suggested decision associated with the submitted requests based on the rankings and/or decisions received from one or more approvers 104. In some implementations, the request management system 108 can also determine a funding amount associated with the request based on current budget allocations, number of requesters, quality of requesters based on a determined request quality score (RQS), and the like. The request management system 108 may be associated with a particular university or institution, such as an independently operating research lab, government lab or agency, and the like.

In certain embodiments, the request management system 108 expedites processing and approval of one or more submitted requests by requesters 102 having a determined RQS that reflects a high correlation between the requester and decision priorities. The RQS is a numerical representation of how well the requester meets predetermined request approval criteria and can be calculated automatically in real-time in response to receiving a submitted request. The request management system 108 can also provide real-time feedback to the requesters 102 regarding a likelihood that a particular request will be approved in light of the calculated RQS, historical data related to previous request decisions associated with the requester 102 or another requester having similar attributes or other similar types of requests.

The requesters 102 include a plurality of computing devices and databases distributed across a widely dispersed network that may be distributed across a large, international geographic area. The requester network can be separate and independent from any network associated with any other participant in the request management environment 100, such as external entities 106 or approvers 104. In some implementations, various processing tasks performed by the request management system 108 can be distributed to computing resources of the submitter network based on processing demands on the computing resources of the request management system 108. In some implementations, the requesters 102 can include faculty, researches, and other employees of a university.

In addition, the data handled and stored by the requesters 102 may be in a different format than the data handled and stored by the other participants of in the request management environment 100. The requesters 102 provide inputs to the request management system 108 that may include request data 122 provided in a request submission indicating details related to the request such as a type of request, terms of the request, and any other details associated with the request. For example, one type of request can be a sabbatical leave request that can include additional information such as requested dates of sabbatical, sabbatical leave location, suggested replacement faculty member during the sabbatical, and reason for requesting the sabbatical. The data provided to the request management system 108 from the requesters 102 may be independent from the other participants and in a different format than the data provided by the external entities 106 and approvers 104.

The approvers 104 include a plurality of computing devices and databases distributed across a widely dispersed network that may be distributed across a large, international geographic area. The approver network can be separate and independent from any network associated with any other participant in the request management environment 100, such as the external entities 106 or requesters 102. In addition, the data handled and stored by the approvers 104 may be in a different format than the data handled and stored by the other participants of in the request management environment 100. In some implementations, various processing tasks performed by the request management system 108 can be distributed to computing resources of the approver network based on processing demands on the computing resources of the request management system 108.

The approvers 104 can provide inputs to the request management system 108 that may include prioritization matrix data 156 that may include ideal request and requester characteristics that are considered to be important by the approvers 104 when determining whether to approve or disapprove the request. The approvers 104 can also provide inputs to the request management system 108 that includes decision data 154 indicating which requests have been approved or disapproved. In some implementations, the approvers 104 include university faculty and leadership that are have a stake in the decisions made regarding the requests submitted by the requestors 102 that can include faculty department heads, deans of colleges, dean of graduate studies, a head and members of a scientific council and various scientific council committees, university administrators, scientific council secretary, secretary of the scientific council, etc. The data provided to the request management system 108 from the approvers 104 may be independent from the other participants and in a different format than the data provided by the external entities 106 and requesters 102. In addition, the approvers 104 can receive data outputs from the request management system 108 with respect to how the requesters 102 were ranked with respect to calculated RQS data 157.

The external entities 106 include a plurality of computing devices and databases distributed across a widely dispersed network that may be distributed across a large, international geographic area. The external entity network can be separate and independent from any network associated with any other participant in the request management environment 100, such as the requesters 102 or approvers 104. In addition, the data handled and stored by the external entities 106 may be in a different format than the data handled and stored by the other participants of in the request management environment 100. In some implementations, the external entities 106 may include an independently operating research lab, government lab or agency, a university that is not affiliated with the request management system 108, academic professional organization, publication reviewing body, or any other entity that has a stake in the decisions being made by the request management system 108. In one example, one or more external entities 106 can be included in an approval chain for various types of requests, such as publication submission requests or research funding requests. The external entities 106 provide inputs to the request management system 108 that may include external source data 120 such as information regarding funding, publication acceptance, or other types of award decisions that may be made by the external entities 106.

In some implementations, the external entities 106 can also include data sources associated with national, government, and/or economic interests that may affect decisions that are made with respect to the submitted requests. For example, the external entities 106 can include web servers/databases that contain data associated with job markets and job growth for a particular location, current economic interests of the government, national and international research priorities, and the like. The data provided to the request management system 108 from the external entities 106 may be independent from the other participants and in a different format than the data provided by the requesters 102 or approvers 104.

The requesters 102, approvers 104, external entities 106, and data repository 114 can connect to the request management system 108 through computing devices 158 (e.g., mobile device 158a, computer 158b, or any other type of computing device) via a wired or wireless network (not shown). The network can include one or more networks, such as the Internet and can also communicate via wireless networks such as WI-FI, BLUETOOTH, cellular networks including EDGE, 3G and 4G wireless cellular systems, or any other wireless form of communication that is known.

The request management system 108 includes one or more engines or modules that perform processes associated with processing incoming requests, collecting data regarding priorities for approving the requests, routing the requests to the approvers 104, and approving the requests submitted by the requesters 102. References to the engines or modules throughout the disclosure are meant to refer to software processes executed by circuitry of one or more processing circuits, which can also be referred to interchangeably as processing circuitry. In one implementation, the processing circuitry can be included in at least one server.

In one example, a user management engine 130 includes one or more processes associated with providing an interface to interact with one or more users (e.g., individuals employed by or otherwise associated with the approvers 104, requesters 102, and/or external entities 106) within the request management environment 100. The processes performed by the engines of the request management system 108 can be executed in real-time in order to provide an immediate response to a system input. In addition, the processes can also be performed automatically in response to a process trigger that can include the reception of data from a data repository, a participant, or another processing engine. For example, the user management engine 130 can control connection and access to the request management system 108 by the approvers 104, requesters 102, and external entities 106 via authentication interfaces at one or more external devices 158 of the approvers 104, requesters 102, and external entities 106.

The request management system 108 also includes a data mining/collection engine 132 that controls the gathering data from the approvers 104, requesters 102, and external entities 106 in real-time. In some implementations, the data mining/collection engine 132 receives data from one or more sources that may have an effect on the generation of a prioritization matrix. The prioritization matrix is used by RQS calculation engine 142 to calculate the RQS for the requesters 102, which indicates the amount of correlation between qualities of the requesters 102 and the submitted request and the priorities associated with approving or disapproving the requests. For example, the data mining/collection engine 132 can receive automatically and/or continuously updated data associated with national and international industries that correspond to types of requests received by the request management system 108. For example, the data mining and collection engine 136 can receive automatic updates from government research institutions related to priorities in various research areas that can include types of medical research and other types of science and engineering research.

In addition, the data mining/collection engine 132 can perform web crawling processes to access the updated data from one or more websites associated with government, economic, and research priorities associated with the external entities 106 that can be used to determine data entries and weighting factors tar the prioritization matrix that is used to calculate the RQS for the submitted request. In addition, the data mining/collection engine 132 can receive manually entered information from the participants in the request management environment 100, such as the request data 122 extracted from the electronically-submitted requests as well as request decisions (e.g., approvals or disapprovals) received from the approvers 104. The data mining/collection engine 132 also monitors websites and/or servers that receive and manage biographical information, performance review scores, and teaching/research information associated with the faculty and staff at the university, which are updated as faculty data 128 stored in data repository 114. For example, the faculty data 128 includes job title, time at university, time in profession, number of students taught by each faculty member, research focus areas, and performance review scores. In addition, the data mining/collection engine 132 can also determine a number of students associated with a faculty member or professor based on class enrollment lists that are maintained on the websites and/or servers. The data mining/collection engine 132 can also determine an amount of monetary profit for the university and/or academic department or college that can be attributed to a faculty member due to external research funding grants and other funding sources based on financial information included in various websites or servers.

In addition, the request management system 108 includes a data management engine 134 that organizes the data received by the request management system 108 and also controls data handling during execution of the processes associated with receiving and processing submitted requests, ranking the requesters 102 based on the calculated RQS associated with a generated prioritization matrix, and routing the requests to the approvers 104 with automatically generated recommendations for whether to approve or disapprove the request. In some implementations, the data management engine 134 processes the data received by the data mining/collection engine 132 and loads extracted data to the request data 122, which can be a database of data files of the requests received from the requesters 102. In addition, the data management engine 134 may perform a data validation/normalization process to configure the received requests into a predetermined format compatible with a format of the files of the request data 122 and ensure that the entries of the received requests have been properly completed.

The data management engine 134 also controls the interaction of the request management system 108 with at least one data repository 114 associated with the request management environment 100. For example, the data management engine 134 can output automatically updated data such as faculty data 128 and external source data 120 or manually updated data such as the request data 122 to the data repository 114. The data management engine 134 can also access any of the data from the data repositories 114 for use by the request management system 108. For example, data generated during the execution of one or more processes by request management system 108 can also be stored in the data repository 114, which can include the prioritization matrix data 156, RQS data 157, or decision data 154. The data management engine 134 controls the flow of data between the data repository 114 and the request management system 108.

The event trigger engine 136 manages the flow of data updates to the request management system 108. In some implementations, the event trigger data 132 detects updates to the request data 122, faculty data 128, prioritization matrix data 156, external source data 120, or any other type of data collected or controlled by the request management system 108. For example, the event trigger engine 136 detects modifications or additions to the files of the request data 122, which may indicate that a new request has been received. When an update is detected to the request data 122, the event trigger engine 136 loads the updated data files to the RQS calculation engine 142 so that the RQS can be calculated for the submitted request. The event trigger engine 136 operates in real-time to update the RQS calculation engine 142 when updated request data 122 is received from the requesters 102. The event trigger engine also operates in real-time to update the prioritization matrix data 156 in response to the data mining/collection engine 132 extracting information related to industries and research focuses of the external entities 106, which is part of the external source data 120. The event trigger engine 136 also operates in real-time to update the faculty data 128 in response to the data mining/collection engine 132 extracting updated biographical information, performance review scores, and teaching/research information of the faculty and staff at the university or updates to the faculty data 128 that occur as faculty members are hired or leave the university. In addition, the event trigger engine 136 operates automatically when updated data is detected by the data/mining and collection engine 136.

In addition, the event trigger engine 136 is configured to detect updates to the data stored in the data repository 114 from the one or more data sources at multiple update velocities. The update velocity of the data corresponds to a rate or frequency at which the request management system 108 receives data updates from the data sources, such as the faculty data 128, external source data 120, or request data 122. In addition, the velocities with which individual participants provide data updates may also vary. For example, performance review scores that are updated in the faculty data 128 may be provided for each faculty member to the request management system 108 at time intervals that correspond to a frequency at which performance reviews are conducted, such as annually. Also, the event trigger engine 136 can also be configured to detect unscheduled updates to the data stored in the data repository 114. For example, case-by-case requests are types of requests that are processed as the requests are received which can be at unpredictable time intervals. For example, sabbatical requests are a type of case-by-case request. The event trigger engine 136 can be configured to detect multiple scheduled and unscheduled updates from multiple data sources in parallel and in real-time.

The request management system 108 also includes a request management engine 138 that processes received request submissions associated with the request management system 108. The request management engine 138 receives requests submitted by the requesters 102. The requesters 102 can submit the requests by accessing a request UI screen output by the GUI engine 150 through a website, server portal, request interface, and the like. In some aspects, one or more of the data entry fields output to the request UI screen corresponds to the entries of a prioritization matrix as well as a request attribute vector. In addition, access to the request UI screen is controlled by the user management engine 130. In response to receiving a submitted request, the request management engine 138 validates the submitted data and outputting notifications to the requesters 102 to correct any information in the submitted request that does not conform to predefined criteria for data entry fields of the request and saves the information from the request data entry fields as request data 122.

In response to receiving a request, the request management engine 138 triggers prioritization matrix engine 140 to generate a prioritization matrix for the request. The preliminary prioritization matrix can include one or more entries associated with biographical characteristics of a potential requester 102 who may submit a particular type of request, characteristics of the type of request, long-term and short-term achievements of a potential requester who may be considered a good candidate for approval of the type request, and corresponding weighting factors indicating a relative amount of importance for the entries. Details regarding the generation of the prioritization matrix and corresponding weighting factors are discussed further herein.

In response to generating the prioritization matrix, the request management engine 138 automatically extracts one or more request attributes from the data entry fields of the submitted request and organizes the request attributes into a request attribute vector, which is also stored in the request data 122 of the data repository 114. In some implementations, the extracted request attributes that make up the request attribute vector correspond to the one or more entries of the generated prioritization matrix. For example, the request attribute vector can include entries associated with biographical information of the requester 102, achievements of the requester 102, as well as information associated with the submitted request. Details regarding the entries of the request attribute vector are discussed further herein.

The request management engine 138 also triggers the RQS calculation engine 142 to calculate an RQS for each of the submitted request based on the prioritization matrix by performing a vector overlap process. Details regarding the functionality of the RQS calculation engine 142 and the vector overlap process are discussed further herein. In response to receiving the calculated RQS for each of the requesters 102 from the RQS calculation engine 142, the request management engine 138 stores the calculated RQSs as RQS data 157 in the data repository 114 and automatically generates an automatic decision prediction, which can be output to the requesters 102 via a UI screen in real time in response to submitting a request to the request management system 108.

In some implementations, the request management engine 138 determines the decision prediction for a particular request by comparing the RQS of the submitted request to an average RQS for similar types of previously submitted requests. For example, the request management engine 138 can assign a level of likelihood or probability that the submitted request will be approved based on an amount the calculated RQS for the submitted request exceeds or falls short of the average RQS for a corresponding type of previously submitted request. The levels of likelihood that the submitted request will be approved may include high, medium, and low likelihoods. In some examples, the level of likelihood is represented by a confidence percentage. In addition to outputting the decision prediction to the requester 102 via a UI, the request management engine 138 also saves the decision prediction in the data repository 114 with the corresponding request data 122 for the requester 102.

The request management engine 138 also determines whether a received request is a case-by-case request or a batch request based on characteristics of the submitted request. In some implementations, case-by-case requests are types of requests that are processed individually as the requests are received and batch requests are types of requests that are processed at predetermined time intervals, which can be referred to as a grouped routing scheme. For example, batch requests may correspond to promotion requests that are processed annually or bi-annually or at another time interval that corresponds to when promotion decisions are made by university leadership. In addition, research funding requests may also be batch requests that are processed at predetermined time intervals that correspond to a beginning or end of a fiscal year when research funds become available for allocation. Award requests for various types of awards (e.g., publishing, research, patent, surgery/performance, teaching, incentive/bonus) can also be classified as batch requests that can be processed when an award application window has closed. Examples of case-by-case requests can include sabbatical leave requests, scientific publication requests, retirement requests, and resignation requests. The request management engine 138 determines whether or not to flag the request for an individual or grouped routing scheme based on whether the request is a case-by-case request or a batch request. Once the request management engine 138 determines whether or not to flag the request for an individual routing scheme, request approval engine 144 is triggered to perform a request routing and approval process, as will be discussed in further detail herein.

The request management system 108 also includes the prioritization matrix engine 140, which automatically generates a prioritization matrix in response to receiving a submitted request. The entries of the prioritization matrix provide an indication of what the approvers 104 may consider to be important request attributes when deciding whether to approve or disapprove a request and are used to generate the RQS, which is a numerical representation of an amount of correlation between the request attribute vector and the prioritization matrix. The prioritization matrix can include one or more entries associated with biographical characteristics of a potential requester 102 who may submit a particular type of request, characteristics of the type of request, long-term and short-term achievements of a potential requester who may be considered a good candidate for approval of the type request, and corresponding weighting factors indicating a relative amount of importance for the entries. In some implementations, the prioritization matrix engine 140 also determines weighting factors for each of the entries of the prioritization matrix that provide an indication of a relative importance of each of the entries. For example, for a request for promotion to associate professor from assistant professor, entries associated with performance review scores and number of years at the university may have higher weighting factors than entries that indicate age or gender of the requester 102. As will be discussed further herein, the weighting factors for each entry of the prioritization matrix are used when calculating the RQS for each of the submitted requests.

In response to receiving a request, the prioritization matrix engine 140 determines whether a prioritization matrix for a corresponding type of request has been generated within a predetermined time period. In some implementations, the prioritization matrix engine 140 can determine that a previously submitted request corresponds to a current request based on one or more request attributes, such as request type, job title, research/teaching focus, and/or number of years at the university. For example, for a promotion request submitted by an assistant professor assigned to a biomedical engineering department, a corresponding type of previously submitted request may be a promotion request submitted by another professor in the biomedical engineering department two weeks prior to the currently submitted request. In some implementations, for batch requests, the predetermined time period is based on a frequency with which the batch requests are processed. For case-by-case requests, the prioritization matrix engine 140 may determine the predetermined time period based on how frequently a particular type of case-by-case request is received. For example, if the request management system 108 typically receives fewer than five sabbatical leave requests within a year, the predetermined time period may be longer than for other types of requests that are submitted more frequently than the sabbatical leave requests.

If a prioritization matrix for the similar type of request has been generated within the predetermined time period, then the prioritization matrix engine 140 accesses the prioritization matrix and corresponding weighting factors for the corresponding request from prioritization matrix data 156 in the data repository 114, which is as a basis for generating the prioritization matrix for the request currently being processed. If a similar type of request has not been processed within the predetermined time period, then the prioritization matrix engine 140 generates a default prioritization matrix for the request. In one example, the data repository 114 stores default prioritization matrices for one or more types of requests as part of the prioritization matrix data 156. For example, the prioritization matrix data 156 can include default prioritization matrices for promotion requests, sabbatical leave requests, various types of award requests, scientific publication requests, research funding requests, retirement requests, resignation requests, and any other type of request that can be submitted by faculty members of a university. In some aspects, the weighting factors for the entries of the default prioritization matrix equal and set to a predetermined value, such as 0.5 in an example where the weighting factors are values between 0 and 1.

In addition, the prioritization matrix engine 140 triggers data mining/collection engine 132 to perform web crawling processes to access keyword data and other external source data 120 from one or more websites associated with government, economic, and research priorities associated with the external entities 106. For example, the data mining/collection engine 132 gathers information related to research priorities in a particular country or region by web crawling through university websites, government research institution websites, etc. and detecting a number of keyword "hits" associated with particular research areas. The keyword data can include words or phrases such as "neurology," "cardiology," "biomedical," "medicine," and any other words associated with various industries or research areas. The keyword data along with any other extracted data can be stored in the data repository 114 as the external source data 120.

The prioritization matrix engine 140 uses the keyword data, other external source data 120, decision data 156, and any other type of data to modify the data entries and weighting factors of the default prioritization matrix or the prioritization matrix associated with a corresponding type of previously submitted request. For example, if the prioritization matrix engine 140 for a research funding request determines that the corresponding type of previously submitted request favored a particular research area, then the prioritization matrix engine 140 may reduce the weighting factor associated with that particular research area and increase the weighting factors associated with other research areas increase a diversity of funding allocated to various research areas. Also, if a currently submitted promotion request is submitted by a biomedical engineering faculty data, and the extracted keyword data indicates that biomedical engineering is more popular than chemistry or biology research topics were for previously submitted requests based on the number of keyword hits, then the prioritization matrix engine 140 may increase the weighting factor for an entry of the prioritization matrix associated biomedical engineering and decrease weighting factors associated with biology and chemistry. The weighting factors for each of the entries of the prioritization matrix can be determined or modified based on inputs received from the approvers 104 or other staff or administrators of the university or other external entities 106.

The request management system 108 also includes an RQS calculation engine 142 that calculates the RQS, which is a numerical representation of an amount of correlation between the request attribute vector and the prioritization matrix and provides an indication of how well the submitted requests meet certain criteria associated with approving the request. The RQS calculation engine 142 performs a vector overlap process, which computes the amount of correlation between the request attribute vector and the prioritization matrix for a particular request. The output of the vector overlap process is sent to the request management engine 138, which generates the automatic decision prediction as previously discussed. Details regarding the vector overlap process are discussed further herein. The RQSs calculated by the RQS calculation engine 142 are stored in the data repository 114 as the RQS data 157.

The request management system 108 also includes a request approval engine 144, which manages a flow of requests or modification request submissions through the one or more approvers 104 in one or more approval chains.

The request approval engine 144 determines an approval chain for a particular request based on approver data 124 stored in the data repository 114. For example, a neurology publication request may be routed through a neurology department chairman while a chemistry publication request may be routed through a chemistry department chairman.

The request approval engine 144 determines whether or not the received request has been flagged for the individual routing scheme based on whether the received request is classified as a case-by-case request. If the request was flagged for the individual routing scheme, then the request approval engine 144 automatically routes the request individually through the approval chain. If the request was not flagged for the individual routing scheme (e.g., a batch request associated with a grouped routing scheme), then the received request remains in a queue until the request window closes. In response to determining that a request window for a particular type of batch requests has closed, the request approval engine 144 automatically triggers the ranking engine 148 to rank the received requests for a particular type of request according to the calculated RQS for each requester. In response to receiving a list of ranked requesters from ranking engine 148, the request approval engine 144 routes the requests through the approval chain.

The request approval engine 144 controls the flow of requests through the approvers 104 based on the approval chain for a particular request or modification request submission. For example, the approvers 104 for a particular type of request can include one or more of a faculty department heads, deans of colleges, dean of graduate studies, a head and members of a scientific council and various scientific council committees, university administrators, scientific council secretary, secretary of the scientific council, etc. In some implementations, the approval chain can be based on a job title of the requester 102. For example, if the requester 102 is an associate professor, then an initial approver 104 in the approval chain is the department head. However, if the requester 102 is a department head, then an initial approver 104 in the approval chain may be a college dean.

In some implementations, the request approval engine 144 triggers the GUI engine 150 to output an approver interface screen to each of the approvers 104 as the submitted requests are routed through the approval chain. The approver interface screen is a dashboard that provides the approvers 104 with various types of data that can include previous decisions for similar types of requests, a history of previous requests made by a particular requester 102, a list of requesters for a particular type of requests, etc. The approver user interface screen provides the approvers the ability to approve or disapprove a request for a particular requester and input additional information related to why the approver 104 approved or disapproved a particular request. The approver user interface screen can also include the decisions by the previous reviewers in the approval chain so that a final approver can make a final request decision based on inputs received from the other approvers 104 in the approval chain. In some implementations, the decision made by the final approver in the approval chain is the final request decision.

Once the requests have been routed through the approval chain and the decision has been determined, the request approval engine 144 triggers approved request management engine 146 to output request approval or disapproval information to the requesters 102 who submitted the requests. The request approval or disapproval information can be output to the requesters with digital signatures or stamps.

The request management system 108 also includes an approved request management engine 146 that controls management of approved requests. In response to receiving the decision associated with a particular request from the request approval engine 144, the approved request management engine 146 outputs approved request information to the requesters 102 as well as stores the approved request information as decision data 154 in the data repository 114, which can be used in future request cycles to generate the prioritization matrix.

In addition to outputting request approval or disapproval information to the requesters 102 who submitted requests, the approved request management engine 146 also manages modification requests in response to receiving a modification request submission for an approved request from a requester 102. In some implementations, the requesters 102 can submit a modification request associated with an approved request to modify one or more terms of the request. For example, the requesters 102 associated with the approved requests can also submit modification requests to modify a research funding term, increase or decrease a research funding award amount, modify sabbatical leave or retirement dates, etc. In some implementations, the approved request management engine 146 receives the modification request submission from the GUI engine 150. The GUI engine 150 receives a modification request at a modification request interface screen where the requesters 102 can input a type of modification request as well as a reason for submitting the modification request.

In response to receiving the modification request submission, the approved request management engine 146 determines whether the request is within predetermined decision terms that provide for automatic approval of the request. For example, the decision data 154 for a research funding request may indicate a maximum funding amount for a particular request. If the modification request is to increase a research funding amount to a total amount that is less than the maximum funding amount, then the approved request management engine 146 outputs a modification approval to the requester and updates the decision data 154 in the data repository 114 to indicate that the approval was granted. If the modification request is not within the predetermined decision terms, then the approved request management engine 146 triggers the request approval engine 144 to mute the modification request submission through the approval chain to process the modification request submission. For example, the approval chain for the modification request submission is based on the type of modification request being submitted and can include one or more of faculty department heads, deans of colleges, dean of graduate studies, a head and members of a scientific council and various scientific council committees, university administrators, scientific council secretary, and secretary of the scientific council. Once the approved request management engine 146 receives a final modification decision from the request approval engine 144, the final modification decision is output to the requester who initiated the modification request, and the decision data 154 stored in the data repository 114 is updated.

The request management system 108 also includes a ranking engine 148 that automatically ranks the submitted requests in real-time according to one or more metrics or categories in response to a ranking request from one of the other processing engines. For example, when a batch request window closes, the request approval engine 144 triggers the ranking engine 148 to rank a particular type of submitted request from highest to lowest RQS. In other implementations, the ranking engine 148 can also rank the requesters 102 according to other metrics such as time at the university, number of publication within the past year, etc.

The request management system 108, in some implementations, also includes a graphical user interface (GUI) engine 150 that controls dissemination and reception of data from the requesters 102, approvers 104, and external entities 106 through one or more user interface (UI) screens that are output to the external devices 158. For example, the GUI engine 150 can output a request UI screen to the requesters 102 who are submitting requests managed by the request management system 108. In addition, the GUI engine 150 can output an approver UI screen which is a dashboard that provides the approvers 104 with various types of data that can include previous decisions for similar types of requests, a history of previous requests made by a particular requester 102, a list of requesters for a particular type of requests, etc. Requesters 102 who have been decision approvals or disapprovals can submit modification request submissions via a modification request UI screen, which is controlled by the GUI engine 150.

The request management system 108, in some implementations, also includes a real-time notification engine 152 that ensures that data input to request management system 108 is processed in real-time. In addition, the processes executed by the real-time notification engine 152 ensure interactions between the participants and the request management system 108 are processed in real-time. For example, the real-time notification engine 152 outputs alerts and notifications to the approvers 104, requesters 102, external entities 106 via the UI screens when a batch request window has open or closed, when a potential requester has submitted a request, when a modification request submission has been received, etc.

In some implementations, data associated with the processes performed by the request management system 108 is stored in one or more data repositories of the request management environment 100 such as the data repository 114. Data received by the request management system 108 from the one or more data sources can be received and stored in real-time with respect to when the data is received from the data sources. In addition, the data can be stored automatically in response to receiving one or more data files from the data sources. The data stored in the data repository 114 can be auto load data that is updated automatically from one or more sources at predetermined time intervals. For example, auto load data can include the faculty data 128 that is automatically updated from institution registrar databases or external source data 120 that is received from the external entities 106 or gathered via web crawling processes.

The data stored in the data repository 114 can also include manually entered information that is input via UIs at the external devices 158 and is received by the data mining/collection engine 132 of the request management system 108. The manually entered information can then be then processed by the data management engine 134 before being disseminated to other processing engines of the request management system 108. The manually entered data can include the request data 122 extracted from the submitted requests and approver data 124 that indicates the approval chain for the requests.

The data repository 114 can also store process execution data that is generated by the request management system 108 when executing the processes associated with, processing and awarding requests, and processing modification request submissions. For example, the process execution data can include decision data 154, prioritization matrix data 156, and RQS data 157.

Figure 2:
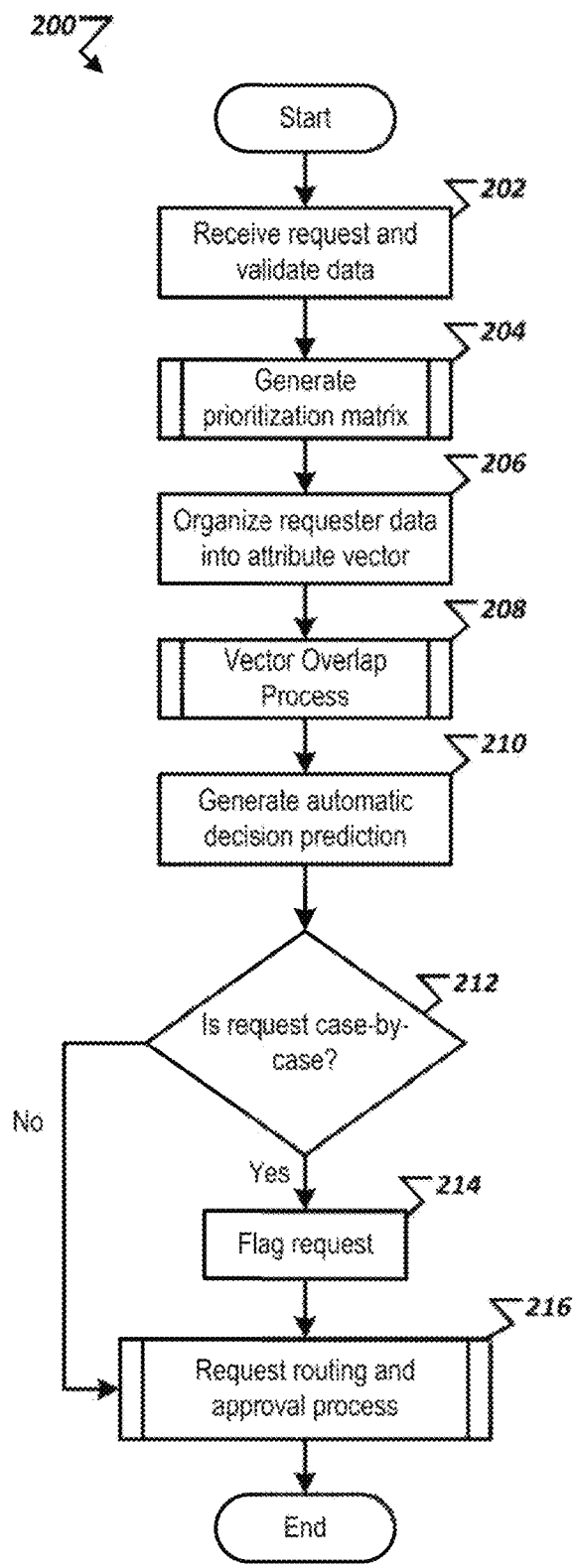
FIG. 2 is a flowchart of a request management process.

FIG. 2 is an exemplary flowchart of a request management process 200, which is controlled by the request management engine 138. For example, the request management engine 138 automatically triggers other processing engines of the request management system 108 in real-time to perform one or more steps of the request management process 200 and processes the data received from the other processing engines in accordance with the steps of the process 200.

At step 202, the request management engine 138 receives requests submitted by the requesters 102. The requesters 102 can submit the requests by accessing a request UI screen output by the GUI engine 150 through a website, server portal, request interface, and the like. In some aspects, one or more of the data entry fields output to the request UI screen corresponds to the entries of a prioritization matrix as well as a request attribute vector. In addition, access to the request UI screen is controlled by the user management engine 130. In response to receiving a submitted request, the request management engine 138 validates the submitted data and outputting notifications to the requesters 102 to correct any information in the submitted request that does not conform to predefined criteria for data entry fields of the request and saves the information from the request data entry fields as request data 122.

At step 204, in response to receiving a request, the request management engine 138 triggers prioritization matrix engine 140 to generate a prioritization matrix for the request. The preliminary prioritization matrix can include one or more entries associated with biographical characteristics of a potential requester 102 who may submit a particular type of request, characteristics of the type of request, long-term and short-term achievements of a potential requester who may be considered a good candidate for approval of the type request, and corresponding weighting factors indicating a relative amount of importance for the entries. Details regarding the generation of the prioritization matrix and corresponding weighting factors are discussed further herein.

At step 206, in response to generating the prioritization matrix, the request management engine 138 automatically extracts one or more request attributes from the data entry fields of the submitted request and organizes the request attributes into a request attribute vector, which is also stored in the request data 122 of the data repository 114. In some implementations, the extracted request attributes that make up the request attribute vector correspond to the one or more entries of the generated prioritization matrix. For example, the request attribute vector can include entries associated with biographical information of the requester 102, achievements of the requester 102, as well as information associated with the submitted request. Details regarding the entries of the request attribute vector are discussed further herein.

At step 208, the request management engine 138 triggers the RQS calculation engine 142 to calculate an RQS for each of the requesters 102 based on the prioritization matrix by performing a vector overlap process. Details regarding the functionality of the RQS calculation engine 142 and the vector overlap process are discussed further herein. In response to receiving the calculated RQS for each of the requesters 102 from the RQS calculation engine 142, the request management engine 138 stores the calculated RQSs as RQS data 157 in the data repository 114.

At step 210, the request management engine 138 determines an automatic decision prediction for a particular request by comparing the RQS of the submitted request to an average RQS for similar types of previously submitted requests. For example, the request management engine 138 can assign a level of likelihood or probability that the submitted request will be approved based on an amount the calculated RQS for the submitted request exceeds or falls short of the average RQS for a corresponding type of previously submitted request. The levels of likelihood that the submitted request will be approved may include high, medium, and low likelihoods. In some examples, the level of likelihood is represented by a confidence percentage. In addition to outputting the decision prediction to the requester 102 via a UI, the request management engine 138 also saves the decision prediction in the data repository 114 with the corresponding request data 122 for the requester 102.

At step 212, the request management engine 138 also determines whether a received request corresponds to a case-by-case request or a batch request based on characteristics of the submitted request. In some implementations, case-by-case requests are types of requests that are processed individually as the requests are received and batch requests are types of requests that are processed at predetermined time intervals. For example, batch requests may correspond to promotion requests that are processed annually or bi-annually or at another time interval that corresponds to when promotion decisions are made by university leadership. In addition, research funding requests may also be batch requests that are processed at predetermined time intervals that correspond to a beginning or end of a fiscal year when research funds become available for allocation. Award requests for various types of awards (e.g., publishing, research, patent, surgery/performance, teaching, incentive/bonus) can also be classified as batch requests that can be processed when an award application window has closed. Examples of case-by-case requests can include sabbatical leave requests, scientific publication requests, retirement requests, and resignation requests. The request management engine 138 determines whether or not to flag the request for the individual or grouped routing scheme based on whether the request is a case-by-case request or a batch request.

If the request management engine 138 determines that the received request is a case-by-case request, resulting in "yes" at step 212, then step 214 is performed where the request data 122 associated with the case-by-case request is flagged for the individual routing scheme, and then step 216 is performed. If the request management engine 138 determines that the received request is a batch request, resulting in a "no" at step 212, then the process 400 proceeds to step 216.

At step 216, once the request management engine 138 determines whether or not to flag the request for the individual routing scheme, request approval engine 144 is triggered to perform a request routing and approval process, as will be discussed in further detail herein.

FIG. 3 is an exemplary screenshot of a request UI screen 300. The request UI 300 may be output by the GUI engine 150 to the requesters 102 accessing the request UI screen 300 via a webpage, server portal, etc. The request UI screen 300 includes multiple data fields and input fields that allow the requesters 102 to view information related to the type of request they are submitting as well as input the request data 122 that is extracted from the electronically-submitted request by the request management engine 138 in response to a selection of submission button 312. For example, the GUI engine 150 outputs a request title to data field 302 that indicates a type of request the requester 102 is submitting. At data input field 304, the GUI engine 150 receives biographical information inputs from the requester 102 that can include name, gender, job title, number of years at university, number of years in profession, research/teaching focus area, etc. At data input field 306, the GUI engine 150 receives historical request information inputs from the requester 102 that can include number of requests submitted in the past year of the same type, number of requests submitted in the past year of all types, number of requests submitted ever of the same type, number of requests submitted in the past year of all types, previous performance review score, average performance review score, etc. At data input field 308, the GUI engine 150 receives other information inputs from the requester 102 that can include a personal statement or essay indicating why the requester believes the request should be approved. The request UI screen 300 can also include other types of input data fields than those described herein. In addition, the request UI screen 300 includes attachment selection 310 that when selected, provides the requester with another UI screen where the requester 102 can attach any additional documentation such as transcripts, recommendation letters, etc. The GUI engine 150 passes the received inputs to the request management engine 138, which are configured into the request attribute vector along with any other information not included in the request attribute vector, which is saved as the requester data 122 in the data repository 114. In some implementations, the data mining/collection engine 132 can detect the information provided at the request UI 300 by crawling websites and/or servers that receive and manage biographical information, performance review scores, and teaching/research information associated with the faculty and staff at the university, which is saved in the data repository as faculty data 128.

Figure 4:
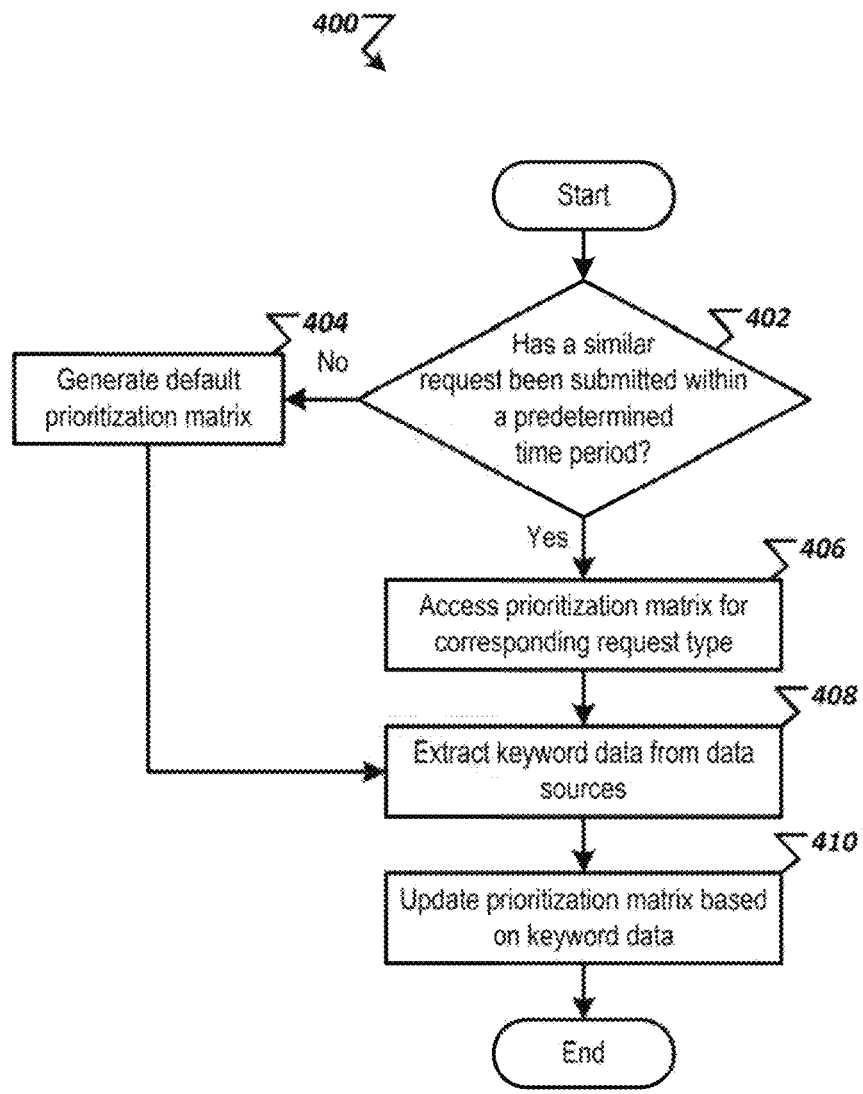
FIG. 4 is a flowchart of a prioritization matrix generation process.

FIG. 4 is an exemplary flowchart of a prioritization matrix generation process 600, which is controlled by the prioritization matrix engine 162. For example, the request management engine 138 automatically triggers other processing engines of the request management system 108 in real-time to perform one or more steps of the prioritization matrix generation process 600 and processes the data received from the other processing engines in accordance with the steps of the process 600. The prioritization matrix engine 140 automatically generates a prioritization matrix in response to receiving a request submission. The entries of the prioritization matrix provide an indication of what the approvers 104 may consider important request attributes when deciding whether to approve or disapprove a request and are used to generate the RQS, which is a numerical representation of an amount of correlation between the request attribute vector and the prioritization matrix.

At step 402, in response to receiving a request, the prioritization matrix engine 140 determines whether a prioritization matrix for a similar type of request has been generated within a predetermined time period. In some implementations, the prioritization matrix engine 140 can determine that a previously submitted request corresponds is similar to a current request based on one or more request attributes, such as request type, job title, research/teaching focus, and/or number of years at the university. For example, for a promotion request submitted by an assistant professor assigned to a biomedical engineering department, a corresponding type of previously submitted request may be a promotion request submitted by another professor in the biomedical engineering department two weeks prior to the currently submitted request. In some implementations, for batch requests, the predetermined time period is based on a frequency with which the batch requests are processed. For case-by-case requests, the prioritization matrix engine 140 may determine the predetermined time period based on how frequently a particular type of case-by-case request is received. For example, if the request management system 108 typically receives fewer than five sabbatical leave requests within a year, the predetermined time period may be longer than for other types of requests that are submitted more frequently than the sabbatical leave requests. If it is determined that a prioritization matrix for a similar type of request has been generated within a predetermined time period, resulting in a "yes" at step 402, then step 406 is performed. Otherwise, if it is determined that a prioritization matrix for a similar type of request has not been generated within the predetermined time period, resulting in a "no" at step 402, then step 404 is performed.

At step 406, if a prioritization matrix for a similar type of request has been generated within the predetermined time period, then the prioritization matrix engine 140 accesses the prioritization matrix and corresponding weighting factors for the previously submitted request from prioritization matrix data 156 in the data repository 114, which is as a basis for generating the prioritization matrix for a current request.

At step 404, if a similar type of request has not been processed within the predetermined time period, then the prioritization matrix engine 140 generates a default prioritization matrix for the request. In one example, the data repository 114 stores default prioritization matrices for one or more types of requests as part of the prioritization matrix data 156. For example, the prioritization matrix data 156 can include default prioritization matrices for promotion requests, sabbatical leave requests, various types of award requests, scientific publication requests, research funding requests, retirement requests, resignation requests, and any other type of request that can be submitted by faculty members of a university. In some aspects, the weighting factors for the entries of the default prioritization matrix equal and set to a predetermined value, such as 0.5 in an example where the weighting factors are values between 0 and 1.

At step 408, the prioritization matrix engine 140 triggers data mining/collection engine 132 to perform web crawling processes to access keyword data and other external source data 120 from one or more websites associated with government, economic, and research priorities associated with the external entities 106. For example, the data mining/collection engine 132 gathers information related to research priorities in a particular country or region by web crawling through university websites, government research institution websites, etc. and detecting a number of keyword "hits" associated with particular research areas. The keyword data can include words or phrases such as "neurology," "cardiology," "biomedical," "medicine," and any other words associated with various industries or research areas. The keyword data along with any other extracted data can be stored in the data repository 114 as the external source data 120.

At step 410, the prioritization matrix engine 140 uses the keyword data, other external source data 120, decision data 156, and any other type of data to update and/or modify the data entries and weighting factors of the default prioritization matrix or the prioritization matrix associated with a corresponding type of previously submitted request. For example, if the prioritization matrix engine 140 for a research funding request determines that the corresponding type of previously submitted request favored a particular research area, then the prioritization matrix engine 140 may reduce the weighting factor associated with that particular research area and increase the weighting factors associated with other research areas increase a diversity of funding allocated to various research areas. Also, if a currently submitted promotion request is submitted by a biomedical engineering faculty data, and the extracted keyword data indicates that biomedical engineering is more popular than chemistry or biology research topics were for previously submitted requests based on the number of keyword hits, then the prioritization matrix engine 140 may increase the weighting factor for an entry of the prioritization matrix associated biomedical engineering and decrease weighting factors associated with biology and chemistry. The weighting factors for each of the entries of the prioritization matrix can be determined or modified based on inputs received from the approvers 104 or other staff or administrators of the university or other external entities 106.

Figure 5:
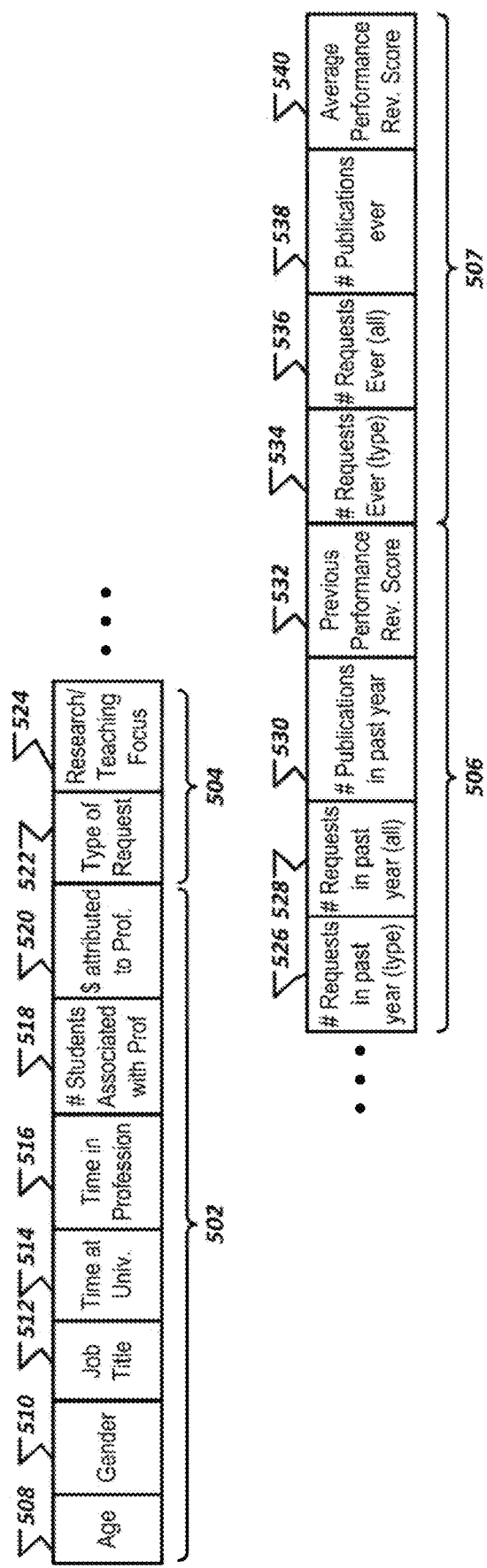
FIG. 5 is an exemplary diagram of a data structure of a request attribute vector.
Figure 6:
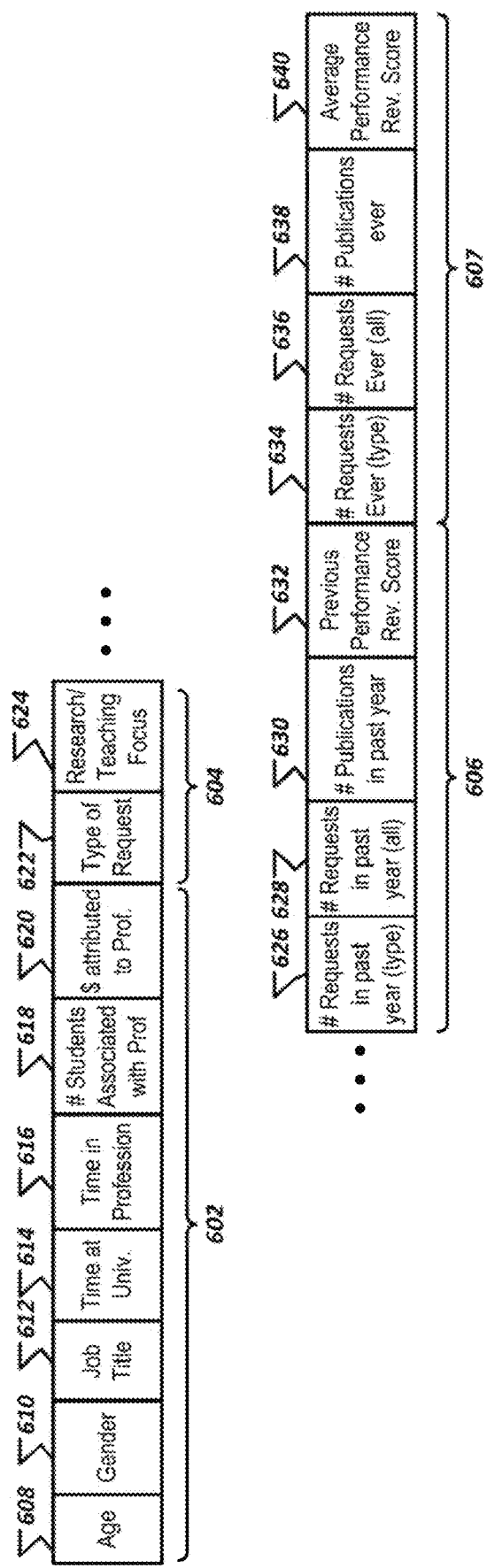
FIG. 6 is an exemplary diagram of a data structure of a prioritization matrix.

FIG. 5 is a data structure of a request attribute vector made that includes the faculty data 128 that is used to characterize a submitted request in the request management process 200. Each of the different components, which will soon be discussed, is used to characterize the constituent components. The request attributes may vary depending on the entries of the prioritization matrix for the associated request. Moreover, the constituent components of the request attribute vector are shown in FIG. 5, and one example of the components of the corresponding prioritization matrix is shown in FIG. 6.

With regard to FIG. 5, each of the components will now be discussed with respect to typical attributes that can be part of the request attribute vector. Attribute 508, A1, relates to an age of a requester. The values for attribute A1 range between 0 and 1, and an example breakdown of how the values are mapped is shown in TABLE 1. While the values are shown to range between 0 and 1, this has been done as a matter of convenience to normalize the impact of each attribute. Other ranges of values may be used as well, perhaps even without each attribute having a same range so that some attributes may be weighted more heavily than others.

TABLE 1

| REQUEST ATTRIBUTE | Age | VALUE Range 0 to 1 |
| --- | --- | --- |
| A1, 508 | <30 | .2 |
| | 30-45 | .4 |
| | 46-55 | .6 |
| | 56-65 | .8 |
| | >65 | 1 |

Attribute 510, A2, includes gender of the requester. Example values for A2 are shown in TABLE 2 below.

TABLE 2

| REQUEST ATTRIBUTE | Gender | VALUE Range 0 to 1 |
| --- | --- | --- |
| A2, 510 | Male | 0 |
| | Female | 0.5 |
| | Other | 1 |

Attribute 512, A3, includes a job title of a requester, which can be indicated as a actual name of a job title or an identification code for the job title. Example values for A3 are shown in TABLE 3 below.

TABLE 3

| REQUEST ATTRIBUTE | Job Title | VALUE Range 0 to 1 |
| --- | --- | --- |
| A3, 512 | Adjunct Professor | 0 |
| | Assistant Professor | 0.25 |
| | Associate Professor | 0.75 |
| | Professor | 1 |

Attribute 514, A4, includes an amount of time the requester has been employed at the university. Example values for A4 are shown in TABLE 4 below.

TABLE 4

| REQUEST ATTRIBUTE | Time at University | VALUE Range 0 to 1 |
| --- | --- | --- |
| A4, 514 | <5 years | 0 |
| | 5-10 years | .25 |
| | 11-15 years | .50 |
| | 16-20 years | .75 |
| | >20 years | 1 |

Attribute 516, A5, includes an amount of time the requester has been in his or her designated profession. Example values for A5 are shown in TABLE 5 below.

TABLE 5

| REQUEST ATTRIBUTE | Time in Profession | VALUE Range 0 to 1 |
| --- | --- | --- |
| A5, 516 | <5 years | 0 |
| | 5-10 years | .25 |
| | 11-15 years | .50 |
| | 16-20 years | .75 |
| | >20 years | 1 |

Attribute 518, A6, indicates a number of students associated with the faculty member/professor, which can include students taught and/or mentored by the faculty member. In some implementations, the data mining/collection engine 132 can determine the number of students associated with a faculty member or professor based on class enrollment lists that are maintained on the websites and/or servers. Examples for A6 are shown in TABLE 7 below.

TABLE 6

| REQUEST ATTRIBUTE | # students associated with professor | VALUE Range 0 to 1 |
| --- | --- | --- |
| A6, 518 | <50 | 0 |
| | 51-100 | 0.25 |
| | 100-500 | 0.75 |
| | >500 | 1 |

Attribute 520, A7, includes an amount of monetary profit attributed to a faculty member submitting a request. In some implementations, the data mining/collection engine 132 can determine an amount of monetary profit for the university and/or academic department or college that can be attributed to a faculty member due to external research funding grants and other funding sources based on financial information included in various websites or servers. Examples for A7 are shown in TABLE 7 below.

TABLE 7

| REQUEST ATTRIBUTE | $ attributed to professor | VALUE Range 0 to 1 |
| --- | --- | --- |
| A7, 520 | <$1,000 | 0 |
| | $1,000-$10,000 | .35 |
| | $10,001-$50,000 | .55 |
| | $50,001-$100,000 | .75 |
| | >$100,000 | 1 |

Attributes 508, 510, 512, 514, 516, 518, and 520 are biographical components of the request attribute vector that provide basic biographical information about the requester. These components of the request attribute vector are referred to as biographical components 502.

Attribute 522, A8, includes a type of request. Examples for A8 are shown in TABLE 8 below.

TABLE 8

| REQUEST ATTRIBUTE | Type of Request | VALUE Range 0 to 1 |
| --- | --- | --- |
| A8, 522 | Promotion | 0 |
| | Sabbatical Leave | .2 |
| | Publication | .4 |
| | Research Funding | .6 |
| | Award | .8 |
| | Retirement | .9 |
| | Resignation | 1 |

Attribute 524, A9, includes a research/teaching focus area of the requester 102 within. Examples for A9 are shown in TABLE 9 below.

TABLE 9

| REQUEST ATTRIBUTE | Class Rank in Major | VALUE Range 0 to 1 |
| --- | --- | --- |
| A9, 524 | Biomedical Engineering | 0 |
| | Neurology | .35 |
| | Cardiology | .55 |
| | Hematology | .73 |
| | Oncology | 1 |

Attributes 522 and 524 are request type components of the request attribute vector that provide information about the type of request that has been submitted. These components of the request attribute vector are referred to as request type components 504.

Attribute 526, A10, includes a number of submitted requests within the past year by the requester that have a corresponding request type to a currently submitted request. Examples for A10 are shown in TABLE 10 below.

TABLE 10

| REQUEST ATTRIBUTE | Number of requests in past year (type) | VALUE Range 0 to 1 |
| --- | --- | --- |
| A10, 526 | 0 | 0 |
| | 1-2 | .35 |
| | 3-5 | .55 |
| | 6-10 | .75 |
| | >10 | 1 |

Attribute 528, A11, includes a total number of all types of submitted requests within the past year by the requester. Examples for A11 are shown in TABLE 11 below.

TABLE 11

| REQUEST ATTRIBUTE | Number of requests in past year (all) | VALUE Range 0 to 1 |
|---|---|---|
| A11, 528 | 0 | 0 |
|  | 1-2 | .25 |
|  | 3-5 | .50 |
|  | 6-10 | .75 |
|  | >10 | 1 |

Attribute 530, A12, includes a number of published works for the requester within the past year. Examples for A12 are shown in TABLE 12 below.

TABLE 12

| REQUEST ATTRIBUTE | # publications in past year | VALUE Range 0 to 1 |
|---|---|---|
| A12, 530 | 0 | 0 |
|  | 1-2 | .25 |
|  | 3-5 | .50 |
|  | 6-10 | .75 |
|  | >10 | 1 |

Attribute 532, A13, includes a previous performance review score for the requester. In some implementations, the performance review score is a numeric value in a range from 0 to 100 but can also be a value in another numerical range, such as 0.0-4.0, 0-5, etc. Examples for A13 are shown in TABLE 13 below.

TABLE 13

| REQUESTER ATTRIBUTE | Overall Class Rank | VALUE Range 0 to 1 |
|---|---|---|
| A13, 532 | 0-25 | 0 |
|  | 26-50 | .35 |
|  | 51-75 | .55 |
|  | 76-85 | .75 |
|  | 86-100 | 1 |

Attributes 526, 528, 530, and 532 are short-term components 506 of the request attribute vector that provide information a requester's recent performance and interactions with the request management system 108.

Attribute 534, A14, includes a total number of submitted requests ever submitted by the requester that have a corresponding request type to a currently submitted request. Examples for A14 are shown in TABLE 14 below.

TABLE 14

| REQUEST ATTRIBUTE | Number of requests ever (type) | VALUE Ranee 0 to 1 |
|---|---|---|
| A14, 534 | 0 | 0 |
|  | 1-10 | .35 |
|  | 11-20 | .55 |
|  | 21-25 | .75 |
|  | >25 | 1 |

Attribute 536, A15, includes a total number of all types of requests that ever been submitted by the requester. Examples for A15 are shown in TABLE 15 below.

TABLE 15

| REQUEST ATTRIBUTE | Number of requests ever (all) | VALUE Range 0 to 1 |
|---|---|---|
| A15, 536 | 0 | 0 |
|  | 1-10 | .25 |
|  | 11-20 | .50 |
|  | 21-25 | .75 |
|  | >25 | 1 |

Attribute 538, A16, includes a total number of works authored by the requester that have ever been published. Examples for A16 are shown in TABLE 16 below.

TABLE 16

| REQUEST ATTRIBUTE | # publications ever | VALUE Range 0 to 1 |
|---|---|---|
| A16, 538 | 0 | 0 |
|  | 1-10 | .25 |
|  | 11-20 | .50 |
|  | 21-25 | .75 |
|  | >25 | 1 |

Attribute 540, A17, includes an average performance review score for the requester for all performance reviews the requester has ever received. In some implementations, the performance review score is a numeric value in a range from 0 to 100 but can also be a value in another numerical range, such as 0.0-4.0, 0-5, etc. Examples for A17 are shown in TABLE 17 below.

TABLE 17

| REQUESTER ATTRIBUTE | Overall Class Rank | VALUE Range 0 to 1 |
|---|---|---|
| A17, 540 | 0-25 | 0 |
|  | 26-50 | .35 |
|  | 51-75 | .55 |
|  | 76-85 | .75 |
|  | 86-100 | 1 |

Attributes 534, 536, 538, and 540 are long-term components 507 of the request attribute vector that provide information a requester's performance and interactions with the request management system 108 over an entire length of a requester's employment by the university.

The request attribute vector can also include other components instead of or in addition to the entries described herein. The expansion attributes can be categorized under the biographical components 502, request type components 504, short-term components 506, or long-term components 507. These too would have exemplary value ranges between 0 and 1.

FIG. 6 is a data structure of a prioritization matrix with entries that provide an indication of what the approvers 104 may consider to be important request attributes when deciding whether to approve or disapprove requests and are used to generate the RQS. According to some aspects, the components of the prioritization matrix may be of the same type and number as the components of the request attribute vector of FIG. 5.

Attribute 608, P1, relates to an age of a requester. Example values for P1 are shown in TABLE 18.

TABLE 18

| ENTRY | Age | VALUE Range 0 to 1 |
|---|---|---|
| P1, 608 | <30 | .2 |
| | 30-45 | .4 |
| | 46-55 | .6 |
| | 56-65 | .8 |
| | >65 | 1 |

Attribute 610, P2, includes gender of the requester. Example values for P2 are shown in TABLE 19 below.

TABLE 19

| ENTRY | Gender | VALUE Range 0 to 1 |
|---|---|---|
| P2, 610 | Male | 0 |
| | Female | 0.5 |
| | Other | 1 |

Attribute 612, P3, includes a job title of a requester, which can be indicated as a actual name of a job title or an identification code for the job title. Example values for P3 are shown in TABLE 20 below.

TABLE 20

| ENTRY | Job Title | VALUE Range 0 to 1 |
|---|---|---|
| P3, 612 | Adjunct Professor | 0 |
| | Assistant Professor | 0.25 |
| | Associate Professor | 0.75 |
| | Professor | 1 |

Attribute 614, P4, includes an amount of time the requester has been employed at the university. Example values for P4 are shown in TABLE 21 below.

TABLE 21

| ENTRY | Time at University | VALUE Range 0 to 1 |
|---|---|---|
| P4, 614 | <5 years | 0 |
| | 5-10 years | .25 |
| | 11-15 years | .50 |
| | 16-20 years | .75 |
| | >20 years | 1 |

Attribute 616, P5, includes an amount of time the requester has been in his or her designated profession. Example values for P5 are shown in TABLE 22 below.

TABLE 22

| ENTRY | Time in Profession | VALUE Range 0 to 1 |
|---|---|---|
| P5, 616 | <5 years | 0 |
| | 5-10 years | .25 |
| | 11-15 years | .50 |
| | 16-20 years | .75 |
| | >20 years | 1 |

Attribute 618, P6, indicates a number of students associated with the faculty member/professor, which can include students taught and/or mentored by the faculty member. In some implementations, the data mining/collection engine 132 can determine the number of students associated with a faculty member or professor based on class enrollment lists that are maintained on the websites and/or servers. Examples for P6 are shown in TABLE 23 below.

TABLE 23

| ENTRY | # students associated with professor | VALUE Range 0 to 1 |
|---|---|---|
| P6, 618 | <50 | 0 |
| | 51-100 | 0.25 |
| | 100-500 | 0.75 |
| | >500 | 1 |

Attribute 620, P7, includes an amount of monetary profit attributed to a faculty member submitting a request. In some implementations, the data mining/collection engine 132 can determine an amount of monetary profit for the university and/or academic department or college that can be attributed to a faculty member due to external research funding grants and other funding sources based on financial information included in various websites or servers. Examples for P7 are shown in TABLE 24 below.

TABLE 24

| ENTRY | $ attributed to professor | VALUE Range 0 to 1 |
|---|---|---|
| P7, 620 | <$1,000 | 0 |
| | $1,000-$10,000 | .35 |
| | $10,001-$50,000 | .55 |
| | $50,001-$100,000 | .75 |
| | >$100,000 | 1 |

Attributes 608, 610, 612, 614, 616, 618, and 620 are biographical components of the prioritization matrix that provide basic biographical information about the requester. These components of the prioritization matrix are referred to as biographical components 602.

Attribute 622, P8, includes a type of request. Examples for P8 are shown in TABLE 25 below.

TABLE 25

| ENTRY | Type of Request | VALUE Range 0 to 1 |
|---|---|---|
| P8, 622 | Promotion | 0 |
| | Sabbatical Leave | .2 |
| | Publication | .4 |
| | Research Funding | .6 |
| | Award | .8 |
| | Retirement | .9 |
| | Resignation | 1 |

Attribute 624, P9, includes a research/teaching focus area of the requester 102 within. Examples for P9 are shown in TABLE 26 below.

TABLE 26

| ENTRY | Class Rank in Major | VALUE Range 0 to 1 |
|---|---|---|
| P9, 624 | Biomedical Engineering | 0 |
| | Neurology | .35 |
| | Cardiology | .55 |
| | Hematology | .75 |
| | Oncology | 1 |

Attributes 622 and 624 are request type components of the prioritization matrix that provide information about the type of request that has been submitted. These components of the prioritization matrix are referred to as request type components 604.

Attribute 626, P10, includes a number of submitted requests within the past year by the requester that have a corresponding request type to a currently submitted request. Examples for P10 are shown in TABLE 27 below.

TABLE 27

| ENTRY | Number of requests in past year (type) | VALUE Range 0 to 1 |
|---|---|---|
| P10, 626 | 0 | 0 |
| | 1-2 | .35 |
| | 3-5 | .55 |
| | 6-10 | .75 |
| | >10 | 1 |

Attribute 628, P11, includes a total number of all types of submitted requests within the past year by the requester. Examples for P11 are shown in TABLE 28 below.

TABLE 28

| ENTRY | Number of requests in past year (all) | VALUE Range 0 to 1 |
|---|---|---|
| P11, 628 | 0 | 0 |
| | 1-2 | .25 |
| | 3-5 | .50 |
| | 6-10 | .75 |
| | >10 | 1 |

Attribute 630, P12, includes a number of published works for the requester within the past year. Examples for P12 are shown in TABLE 29 below.

TABLE 29

| ENTRY | # publications in past year | VALUE Range 0 to 1 |
|---|---|---|
| P12, 630 | 0 | 0 |
| | 1-2 | .25 |
| | 3-5 | .50 |
| | 6-10 | .75 |
| | >10 | 1 |

Attribute 632, P13, includes a previous performance review score for the requester. In some implementations, the performance review score is a numeric value in a range from 0 to 100 but can also be a value in another numerical range, such as 0.0-4.0, 0-5, etc. Examples for P13 are shown in TABLE 30 below.

TABLE 30

| ENTRY | Overall Class Rank | VALUE Range 0 to 1 |
|---|---|---|
| P13, 632 | 0-25 | 0 |
| | 26-50 | .35 |
| | 51-75 | .55 |
| | 76-85 | .75 |
| | 86-100 | 1 |

Attributes 626, 628, 630, and 632 are short-term components 606 of the prioritization matrix that provide information a requester's recent performance and interactions with the request management system 108.

Attribute 634, P14, includes a total number of submitted requests ever submitted by the requester that have a corresponding request type to a currently submitted request. Examples for P14 are shown in TABLE 31 below.

TABLE 31

| ENTRY | Number of requests ever (type) | VALUE Range 0 to 1 |
|---|---|---|
| P14, 634 | 0 | 0 |
| | 1-10 | .35 |
| | 11-20 | .55 |
| | 21-25 | .75 |
| | >25 | 1 |

Attribute 636, P15, includes a total number of all types of requests that ever been submitted by the requester. Examples for P15 are shown in TABLE 32 below.

TABLE 32

| ENTRY | Number of requests ever (all) | VALUE Range 0 to 1 |
|---|---|---|
| P15, 636 | 0 | 0 |
| | 1-10 | .25 |
| | 11-20 | .50 |
| | 21-25 | .75 |
| | >25 | 1 |

Attribute 638, P16, includes a total number of works authored by the requester that have ever been published. Examples for P16 are shown in TABLE 33 below.

TABLE 33

| ENTRY | # publications ever | VALUE Range 0 to 1 |
|---|---|---|
| P16, 638 | 0 | 0 |
| | 1-10 | .25 |
| | 11-20 | .50 |
| | 21-25 | .75 |
| | >25 | 1 |

Attribute 640, P17, includes an average performance review score for the requester for all performance reviews the requester has ever received. In some implementations, the performance review score is a numeric value in a range from 0 to 100 but can also be a value in another numerical range, such as 0.0-4.0.0-5, etc. Examples for P17 are shown in TABLE 34 below.

TABLE 34

| ENTRY | Overall Class Rank | VALUE Range 0 to 1 |
|---|---|---|
| P17, 640 | 0-25 | 0 |
| | 26-50 | .35 |
| | 51-75 | .55 |
| | 76-85 | .75 |
| | 86-100 | 1 |

Attributes 634, 636, 638, and 640 are long-term components 607 of the prioritization matrix that provide information a requester's performance and interactions with the request management system 108 over an entire length of a requester's employment by the university.

The prioritization matrix can also include other components instead of or in addition to the entries described herein. The expansion entries can be categorized under the biographical components 602, request type components 604, short-term components 606, or long-term components 607. These too would have exemplary value ranges between 0 and 1.

Figure 7:
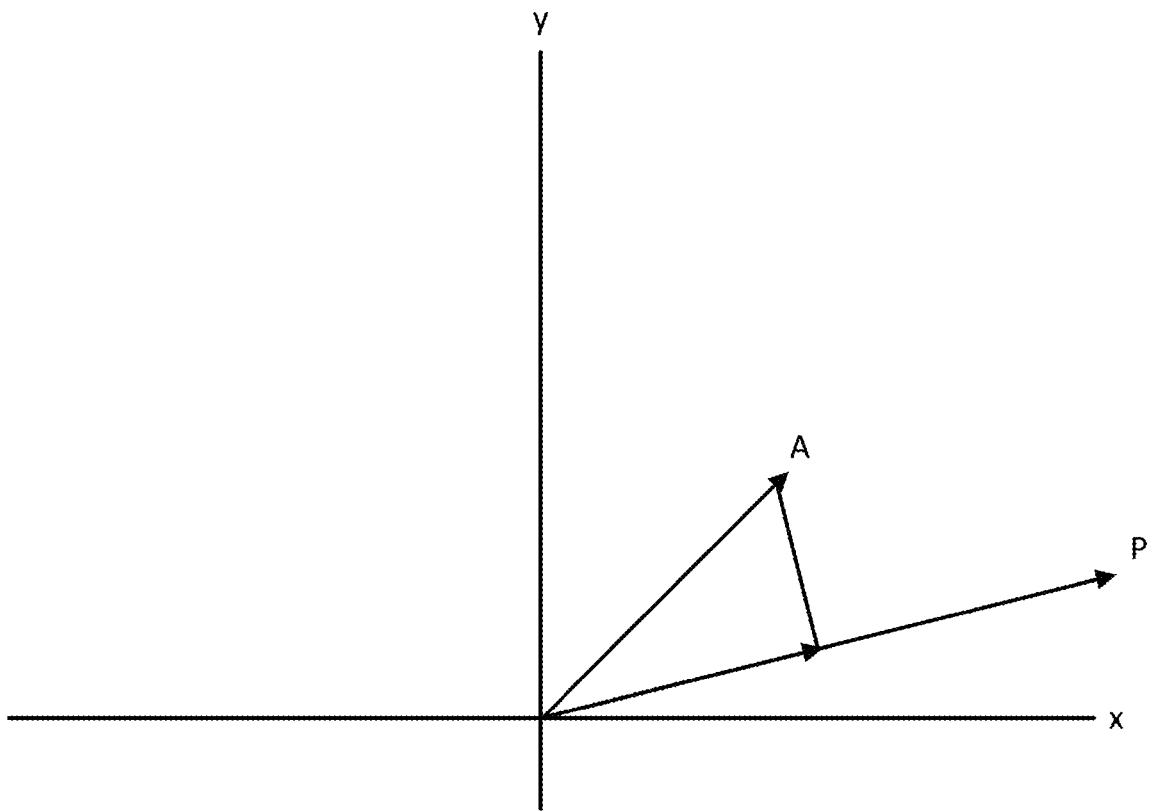
FIG. 7 is a graph of a request attribute vector and a prioritization matrix in two dimensional space.

Next, FIG. 7 is a graph of a request attribute vector and a prioritization matrix in two dimensional space, according to certain embodiments. As seen, the request attribute vector, A, may reflect some but not all of the attributes covered by one particular prioritization matrix, P. If this is the case, the magnitude of the projection vector of the request attribute vector, A, onto the prioritization matrix, P, may indicate an amount of commonality between the two vectors. Accordingly, the RQS calculated by the RQS calculation engine 142 is a numerical representation of the commonality between the request attribute vector, A, and the prioritization matrix, P.

Although there are different axes x and y shown, these axes are not necessarily orthogonal, but instead have some attributes in one of the vectors (A or P) that are correlated with other attributes in other vectors. Nevertheless, in order to identify how a set of request attribute data maps into the two domains, a mapping process is performed to see how the request attribute vector maps onto one or more prioritization matrices. The magnitude of the vectors along each axis is a function of the additive values of the attributes that make up the vector. For example, in the request attribute vector, the range of values of an amount of time at the university may be 0.00 to 50.00, for example. The maximum contribution to the magnitude of the A vector is if the request has the same amount of time at the university as the amount of time at the university entry in the corresponding prioritization matrix. This particular attribute (amount of time at the university) can then be weighted based on a weighting table (as will be discussed) to help normalize the amount of contribution that attribute may have relative to other attributes that make up the vector.

Figure 8:
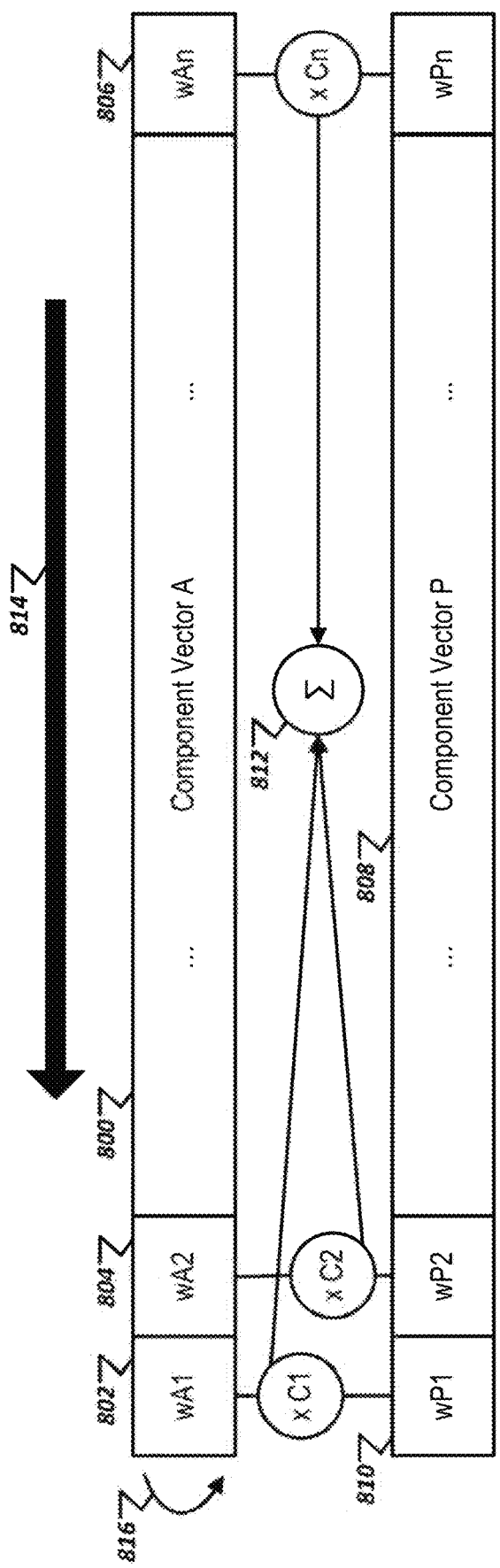
FIG. 8 is a graphical illustration of a request quality score calculation.

FIG. 8 is a graphical illustration of how pairs of vectors (P, A) are compared to one another to arrive at a determination of an amount of commonality between the two vectors (e.g., the RQS), according to certain embodiments. FIG. 8 includes vector A 800 with exemplary weighted attributes w1aA1 802, w2aA2 804, and wnaAn 806 (the weights are shown for brevity in the Figure as w), although other weighted attributes would be included in the process. The respective weights are set based on the query that is made based on the request data 122 extracted from the submitted request. Vector P 808 includes similar weighted attributes, such as w1pP1. Weighting the attributes adjusts the spatial size associated with that particular attribute, thus affecting the potential size of the correlation graph for that particular vector (e.g., it affects how big the A shape is on the correlation vector, for example). Weighting the correlation calculations adjusts the relative contributions each pair of components (e.g., A1,P1) contributes to an overlap area in the correlation graph (e.g., the projection of the A vector onto the P vector).

In a first multiplication step, w1aA1 1002 is multiplied with w1pP1 810, and the product is multiplied by a correlation weight C1 and the result sent to an accumulator (summation device) 812. The correlation weight C1 is a coefficient that adjusts the level of relevance for the matching pair for the query made. The products from the other matching pairs of weighted components from the vectors are multiplied (e.g., w2aA2×w2pP2 . . . wnaAn×wnpPn), adjusted by their respective correlation weight (Cx, x being an index), and summed in the accumulator 812. Then the weighted attributes in one vector (vector A 800 in this example) are shifted left 814 by one position and then then are multiplied by the corresponding weighted attribute in vector P 808 and correlation weight C2. For example, in the second step w2aA2 804 is multiplied by w1pP1 810 and the product is multiplied by a correlation weight Cx and the result is summed with the other products in the accumulator 812. The one exception is that the left most weighted attribute (which in this case is w1aA1) is circular shifted right 816 so as to take the position of wnaAn 806. This process continues until all of the weighted attributes of one vector are multiplied, adjusted by a correlation weight, and summed with all the other attributes of the other vector.

With regard to the weights, each attribute of each vector is first weighted such that each attribute is either weighted with a 0 or a value between zero and 1. A zero value means that the subject attribute does not contribute at all. Values closer to 1 are deemed to be associated with attributes that have a higher relevance toward attributes of an ideal candidate receiving a request approval. Each attribute of each vector is then combined (multiplied in this example, but could also be added or combined in another mathematical fashion) with each attribute of the other vectors, and a resultant sum is obtained. The weighted vector correlation of the A and P vectors results in the overlap area of the two vectors.

While in the above-described embodiment, there a fixed weight is assigned to each attribute for each vector. However, for an even more refined correlation process, a separate weight is applied for each attribute for each multiplication performed. For example, there may be a high correlation between a requester who has a high well-roundedness score and the quality of the requester. However, there may be little correlation weight for the ethnicity or hometown of the requester.

Each query will have a relevant subset of weights for each vector (signifying the contribution of each particular attribute to each vector space in the correlation graph (e.g., the size of region A). Furthermore the correlation between the two spaces (e.g., between A and P) is influenced by the weight of the correlation of each pair of vector attributes (e.g., A1, P1) for that particular query. The tables below include the attribute weights and correlation weights for a request. For any weight or coefficient not particularly provided for, its value is set at 0.5, although it may be changed to any value ranging between 0 and 1.

Attribute Weight table for a biomedical engineering research funding request.

TABLE 35

| Attribute | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| A | .8 | 1 | .6 | .7 | .7 | .8 | .6 | .8 | .8 | .9 | .7 | 1 | .5 | .7 | .3 | .9 | .3 |
| P | .8 | .9 | .8 | .9 | 1 |  | .9 | .8 | .7 | .6 | .5 | .4 | .3 | .8 | .2 | .1 | .4 | .7 |

A vector Correlation Coefficient Table for P regarding the biomedical engineering research funding request.

TABLE 36

| Attribute | CCp1 | CCp2 | CCp3 | CCp4 | CCp5 | CCp6 | CCp7 | CCp8 | CCp9 | CCp10 | CCp11 |
|---|---|---|---|---|---|---|---|---|---|---|---|
| A1 | 1 | .8 | .8 | .8 | 1 | .8 | .6 | .4 | .2 | .1 | .1 |
| A2 | 1 | .8 | .8 | .8 | 1 | .8 | .6 | .4 | .2 | .1 | .1 |
| A3 | 1 | .8 | .8 | .8 | 1 | .8 | .6 | .4 | .2 | .1 | .1 |
| A4 | .8 | .8 | .6 | .8 | .8 | .6 | .4 | .2 | .1 | .1 | .1 |
| A5 | .8 | .8 | .6 | .8 | .8 | .6 | .4 | .2 | .1 | .1 | .1 |
| A6 | 1 | 1 | 1 | 1 | 1 | 1 | 1 | 1 | 1 | 1 | 1 |
| A7 | .8 | .8 | .6 | .8 | .8 | .6 | .4 | .2 | .1 | .1 | .1 |
| A8 | .9 | .9 | .7 | .8 | .9 | .7 | .5 | .3 | .1 | 0 | .5 |
| A9 | .9 | .9 | .7 | .8 | .9 | .7 | .5 | .3 | .1 | 0 | .5 |
| A10 | .9 | .9 | .7 | .8 | .9 | .7 | .5 | .3 | .1 | 0 | .5 |
| A11 | .9 | .9 | .7 | .8 | .9 | .7 | .5 | .3 | .1 | 0 | .5 |
| A12 | .9 | .9 | .7 | .8 | .9 | .7 | .5 | .3 | .1 | 0 | .5 |
| A13 | .8 | .6 | .3 | .5 | .2 | .8 | .9 | .2 | .6 | .4 | .5 |
| A14 | .7 | .8 | .9 | .5 | .6 | .7 | .7 | .6 | .4 | .3 | .5 |
| A15 | .3 | .1 | .4 | .8 | .9 | .2 | .6 | .1 | .5 | .9 | .2 |
| A16 | .1 | .2 | .1 | .1 | .1 | .1 | .5 | .1 | .2 | .4 | .4 |
| A17 | .9 | .9 | .7 | .8 | .9 | .7 | .5 | .3 | .1 | 0 | .5 |

This process of identifying attributes, weights and correlation coefficients may be applied to other A-P correlation space analyses for different prioritization matrices as well as other database queries. Similar weight and coefficient tables are stored for other types of requests managed by the request management system 108.

Figure 9:
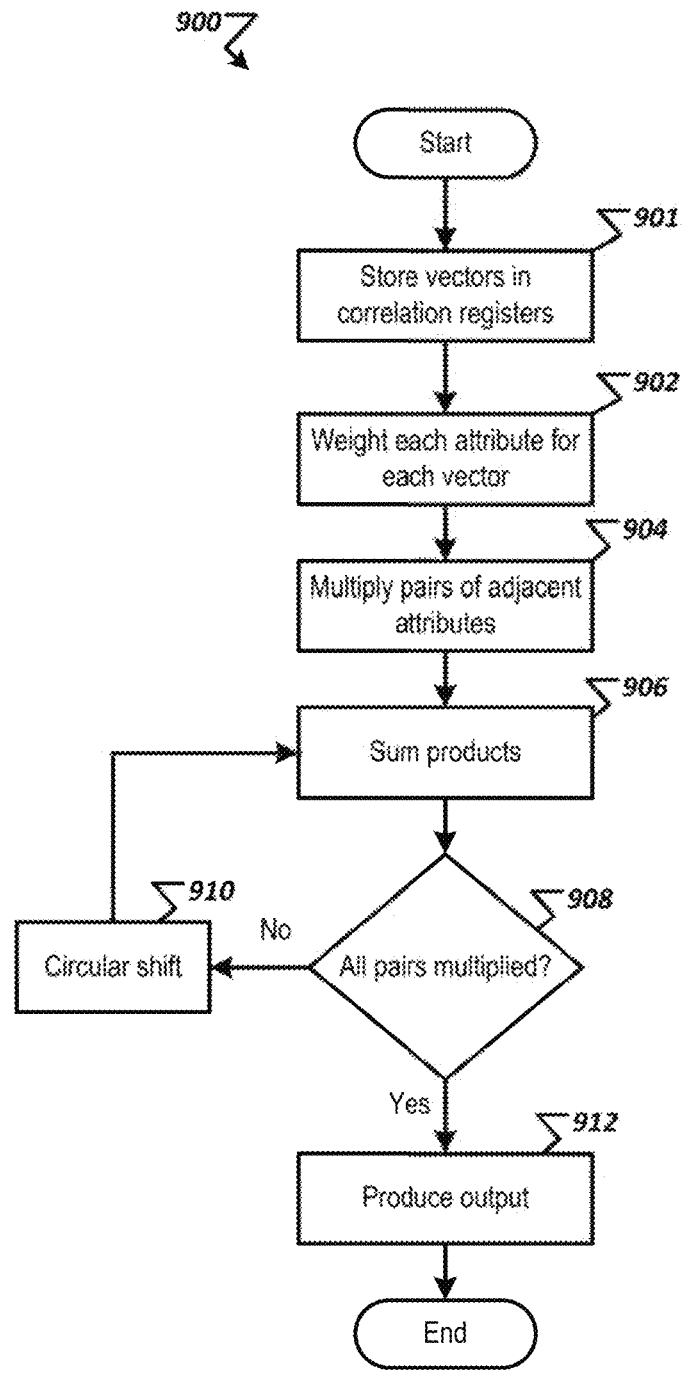
FIG. 9 is a flowchart of a vector overlap process.

Next, FIG. 9 is a flowchart of a vector overlap process 900 for determining the overlap amounts for the request attribute vector and the prioritization matrix for a particular request, according to certain embodiments. The vector overlap process 900 is controlled by the RQS calculation engine 142. For example, the RQS calculation engine 142 automatically triggers other processing engines of the request management system 108 in real-time to perform one or more steps of the vector overlap process 900 and processes the data received from the other processing engines in accordance with the steps of the process 900. The RQS calculation engine 142 automatically calculates the RQS for a requester 102 in response to the generation of a request attribute vector by the request management engine 138.

The process begins at step 901 where the RQS calculation engine 142 stores the prioritization matrix for the request in a first correlation register and the request attribute vector for the requester 102 in a second correlation register.

At step 902 where each of the entries of the prioritization matrix has a weight applied thereto. The weights are stored in a memory table of the prioritization data 156 with the corresponding prioritization matrix. The process then proceeds to step 904 where pairs of weighted adjacent entries of the prioritization matrix and request attribute vector are multiplied with each other, and then in 906 the products of all the multiplications are accumulated. Then in step 908 a query is made regarding whether all the pairs of entries have been multiplied. If the response to the query is negative, the process proceeds to step 910 where the attributes in one vector are circular shifted and the process then returns to step 904. However, if the response to the query in step 908 is affirmative, the process proceeds to 912, where the cumulative output is produced and used for graphical analysis. The value that is output is fraction of the total overlap if the max weight is applied to the max value of all attributes for all vectors and the correlation is performed on that maximum condition. Moreover, the output that is produced at step 912 can be a percentage of the maximum possible overlap space for the request attribute vector and the different component prioritization matrices.

The output produced at step 912 corresponds to the RQS is then sent to the request management engine 138, which generates the automatic decision prediction as previously discussed.

Figure 10:
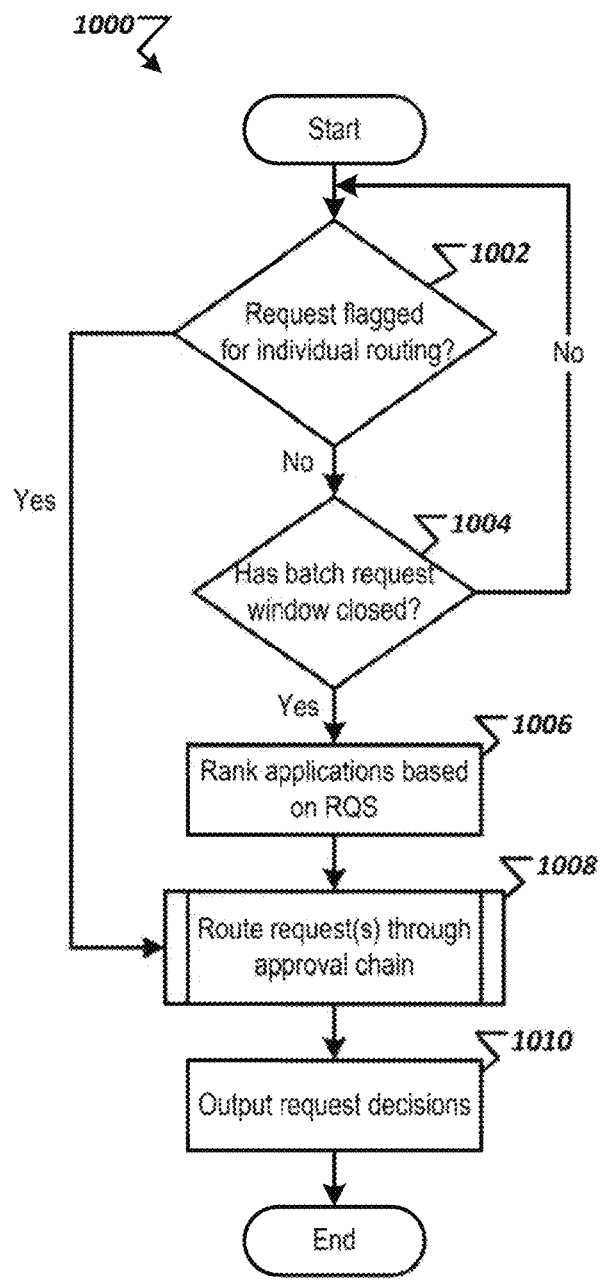
FIG. 10 is a flowchart of a request approval process.

FIG. 10 is an exemplary flowchart of a request approval process 1200. The request approval process 1000 is controlled by the request approval engine 144, which automatically triggers other processing engines of the request management system 108 in real-time to perform one or more steps of the request approval process 1000 and processes the data received from the other processing engines in accordance with the steps of the process 1000.

At step 1002, the request approval engine 144 determines whether or not the received request has been flagged for the individual routing scheme based on whether or not the request is classified as a case-by-case request. If the request was flagged for the individual routing scheme, resulting in a "yes" at step 1002, then the process continues to step 1008, and the request approval engine 144 automatically routes the request through the approval chain. If the request was flagged for the grouped routing scheme (e.g., a batch request), resulting in a "no" at step 1002, then the process proceeds to step 1004.

At step 1004, the request approval engine 144 determines whether a batch request window has closed. In some implementations, submitted batch requests remain in a queue until a batch request window closes. If the batch request window has closed, resulting in a "yes" at step 1004, then step 1006 is performed. Otherwise, if the batch request window has not closed, resulting in a "no" at step 1004, then the process returns to step 1002.

At step 1006, in response to determining that the batch request window has closed, the request approval engine 144 automatically triggers the ranking engine 148 to rank the received requests for a particular type of request according to the calculated RQS for each submitted request.

At step 1008, in response to receiving the ranked requests from the ranking engine 148 or in response to receiving a request that is flagged for the individual routing scheme, the request approval engine 144 routes the requests through the approval chain by performing a request routing process. Details regarding the request routing process are discussed further herein.

At step 1010, once the requests have been routed through the approval chain and decisions have been determined, the request approval engine 144 triggers approved request management engine 146 to output request approval or disapproval information to the requesters 102 associated with the decision. The request approval or disapproval information can be output to the requesters with digital signatures or stamps. The approved request management engine 146 also stores the approved request information as decision data 154 in the data repository 114, which can be used in future requests to generate the prioritization matrix.

Figure 11:
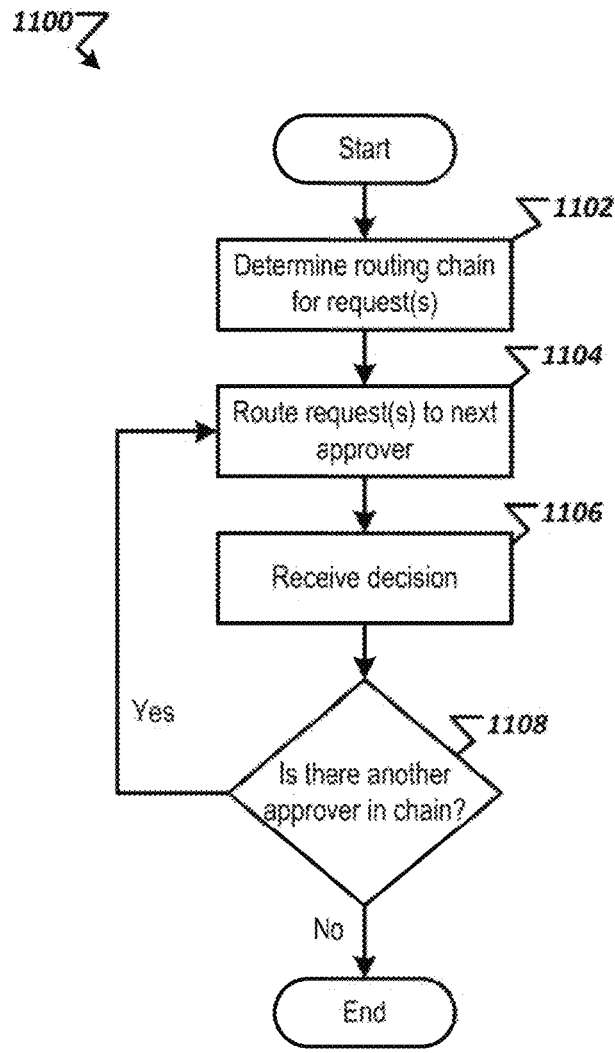
FIG. 11 is a flowchart of a request routing process.

FIG. 11 is an exemplary flowchart of a request routing process 1100. The request routing process 1100 is controlled by the request approval engine 144, which automatically triggers other processing engines of the request management system 108 in real-time to perform one or more steps of the request routing process 1100 and processes the data received from the other processing engines in accordance with the steps of the process 1100.

At step 1102, the request approval engine 144 determines an approval chain for a particular request based on approver data 124 stored in the data repository 114. For example, the approvers 104 for a particular type of request can include one or more of faculty department heads, deans of colleges, dean of graduate studies, a head and members of a scientific council and various scientific council committees, university administrators, scientific council secretary, secretary of the scientific council, etc. In some implementations, the approval chain can be based on a job title of the requester 102. For example, if the requester 102 is an associate professor, then an initial approver 104 in the approval chain is the department head. However, if the requester 102 is a department head, then an initial approver 104 in the approval chain may be a college dean.

At step 1104, the request approval engine 144 routes the requests for a particular request to a next approver in the approval chain. The approver interface screen is a dashboard that provides the approvers 104 with various types of data that can include previous decisions for similar types of requests, a history of previous requests submissions by a particular requester 102, a list of requesters for a particular type of requests, etc.

At step 1106, the request approval engine 144 receives the decision from the approver 104. The approver user interface screen provides the approvers the ability to approve or disapprove a request for a particular requester and input additional information related to why the approver 104 approved or disapproved a particular request. The approver user interface screen can also include the decisions by the previous reviewers in the approval chain so that a final approver can make a final request decision based on inputs received from the other approvers 104 in the approval chain. In some implementations, the decision made by the final approver in the approval chain is the final request decision.

At step 1108, the request approval engine 144 determines whether or not there is another approver in the approval chain. If a current approver is not the final approver, resulting in a "yes" at step 1108, then the process proceeds to step 1104 to route the requests to the next approver in the approval chain. If the current approver is the final approver, resulting in a "no" at step 1108, then the process is terminated.

FIG. 12 is an exemplary screenshot of an approver UI screen 1200. The approver UI screen 1200 may be output by the GUI engine 150 to the approvers 104 in the approval chain for a particular type of request. The approver UI screen 1200 includes multiple data fields and input fields that allow approvers 104 to view information related to the submitted requests and the corresponding requesters 102. A request identification tab 1202 indicates which type of request the approver 104 is viewing. For example, the request tab 1202 can include the type of request and corresponding details along with a serial number that uniquely identifies the type of request, such as a neurology research award as shown in FIG. 12. In some implementations where the approver 104 is in the approval chain for multiple requests, the approver UI screen can include multiple request identification tabs 1202 associated with each of the types of requests that can be selected by the approver.

At data input field 1206 of the approver UI screen 1200, the GUI engine 150 outputs a list of the requesters 102 who have submitted a particular type of request along with an identification number and the corresponding RQS that was calculated for the requester by the RQS calculation engine 142. The approver 104 can select a requester 1208 from the data input field 1206, and in response, the GUI engine 150 outputs a request decision field 1210 where the approver 104 can view the submitted request and indicate a recommendation of whether or not to approve the request along with a recommended funding amount, if applicable.

At data field 1204, the GUI engine 150 outputs previous request submissions made by a particular requester over a period of time, which may aid the approvers 104 in making request decisions. For example, the data field 1204 shows that the requester 1208 selected at data field 1206 submitted a research funding request in 2012, a promotion request in 2013, a teaching award request in 2014, a research funding request in 2015, and a publication request in 2016. In some implementations, in response to receiving a selection of a previous request submission, the GUI engine 150 outputs additional information to the approver 104 associated with the previous request submission.

At data field 1212, the GUI engine 150 provides previous decision statistics for various types of requests. For example, the data field 1212 allows the approver 104 to select a year, request type, and additional request details in order to provide filtered previous decision statistics that may aid the approver 104 in deciding whether to approve or disapprove the request.

FIG. 13 is an exemplary illustration of a portion of the request management environment that includes computing resources of a processing engine, such as request approval engine 1331 and computing resources of an approver network 1304 that presents the approver UI screens to computing devices 1358 of the approvers 104. In some implementations, the network 1304 can also represent the approver network or the external entity network. In some implementations, the computing resources of the approver network 1304 can be configured to perform various processes associated with the request management system 108, such as the request routing process 1100 (FIG. 11).

In one example, in response to determining that an amount of network or processing congestion of at computing resources of the request approval engine 1331 is greater than a predetermined threshold, the request approval engine 1331 may transmit a processing resource query 1326 to the computing resources of other networks connected to the request management system 108, such as the approver network 1304, requester network, and/or external entity network. In response to transmitting the processing resource query to the computing resources of the other networks, the request approval engine 1331 receives processing capability response messages 1328 from the other networks indicating processing capabilities of the associated computing resources. Based on the processing capabilities of the computing resources associated with the connected networks, the request approval engine 1331 selects the network to allocate processing resources from in order to reduce the processing burden on the request approval engine 1331. In one example, the request approval engine 1331 selects the computing resources from the connected network that has a greatest processing capacity. In other implementations, the request approval engine 1331 selects the computing resources from the connected network based on a type of task associated with the processing engine. For example, because the request approval engine 1331 performs tasks associated with presenting approver UI screens to approvers 104 and receiving request decisions from the approvers 104, the request approval engine 1331 may determine that the selected network is the approver network 1304.

In response to selecting the approver network 1304 for processing resource allocation, the request approval engine 1331 transmits an enhanced data packet 1324 to the approver network 1304, which can also function as a command to the approver network 1304 to perform the request routing process 1100 or any other process associated with the request approval engine 1331. For example, the enhanced data packet 1324 can include at least one of one or more request attribute vectors for the requesters for a particular request, the prioritization matrix for the request, or RQSs of the requesters. By condensing the information associated with the request and requesters into a single data structure that is transmitted as the enhanced data packet, vast amounts of data are condensed, which reduces computer network congestions. In addition, other processing tasks associated with other processing engines of the request management system 108 can be similarly distributed to the approver network 1404 as well as the requester network and external entity network. Once the computing resources of the approver network 1304 have performed the processing tasks associated with the enhanced data packet 1324, the approver network 1304 transmits processing task results 1330 back to the request approval engine 1331.

Figure 14:
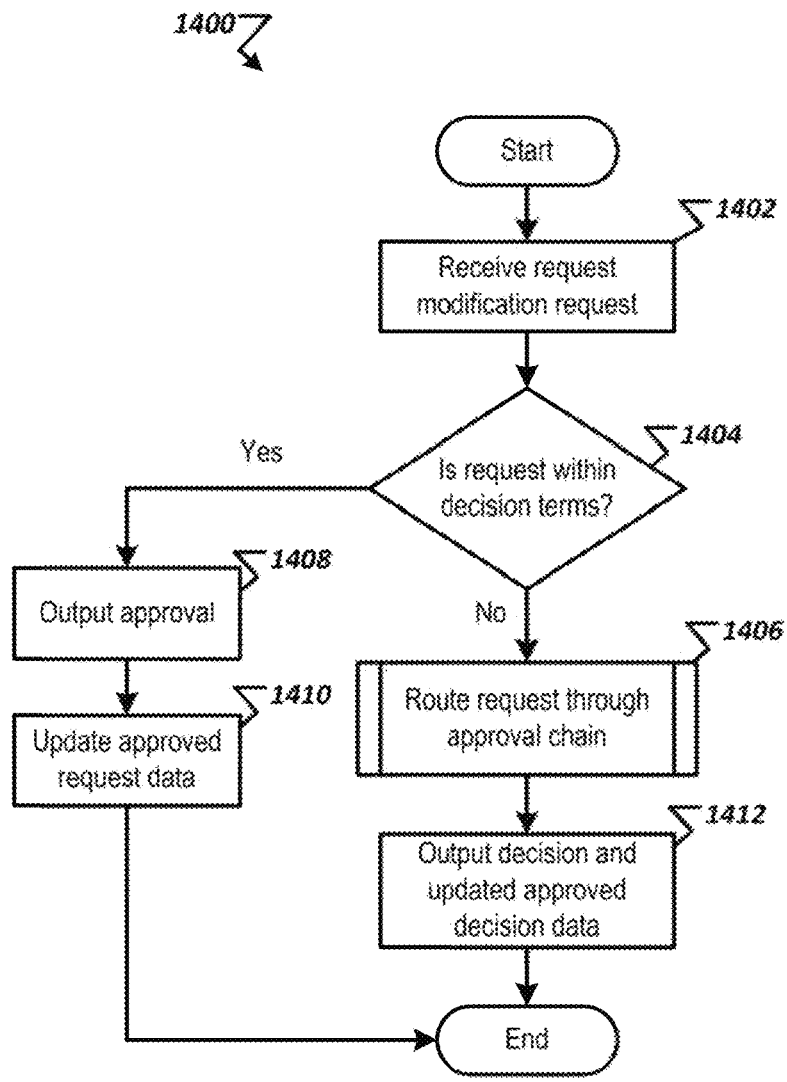
FIG. 14 is a flowchart of a modification request process.

FIG. 14 is an exemplary flowchart of a modification request process 1400. The modification request process 1400 is controlled by the approved request management engine 146, which automatically triggers other processing engines of the request management system 108 in real-time to perform one or more steps of the modification request process 1400 and processes the data received from the other processing engines in accordance with the steps of the process 1400.

At step 1402, the approved request management engine 146 receives a modification request submission from a requester who has received a decision approval. In addition to outputting request approval or disapproval information to the requesters 102 who submitted requests, the approved request management engine 146 also manages modification requests in response to receiving a modification request submission for an approved request from a requester 102. In some implementations, the requesters 102 can submit a modification request associated with an approved request to modify one or more terms of the request. For example, the requesters 102 associated with the approved requests can also submit modification requests to modify a research funding term, increase or decrease a research funding award amount, modify sabbatical leave or retirement dates, etc. In some implementations, the approved request management engine 146 receives the modification request submission from the GUI engine 150. The GUI engine 150 receives a modification request at a modification request interface screen where the requesters 102 can input a type of modification request as well as a reason for submitting the modification request.

At step 1404, in response to receiving the modification request submission, the approved request management engine 146 determines whether the request is within predetermined decision terms that provide for automatic approval of the request. For example, the decision data 154 for a research funding request may indicate a maximum funding amount for a particular request. If the modification request is within the decision terms, resulting in a "yes" at step 1404, then step 1408 is performed. Otherwise, if the modification request is not within the predetermined decision terms, resulting in a "no" at step 1404, then step 1406 is performed.

At step 1408, if the modification request is within the predetermined decision terms, then the approved request management engine 146 outputs an approval to the requester who submitted the modification request and at updates the decision data 154 in the data repository 114 to indicate that the approval was granted at step 1410. For example, if the modification request is to increase a research funding amount to a total amount that is less than the maximum funding amount, then the approved request management engine 146 outputs a modification approval to the requester and updates the decision data 154 in the data repository 114 to indicate that the approval was granted.

At step 1406, if the modification request is not within the predetermined decision terms, then the approved request management engine 146 triggers the request approval engine 144 to route the modification request submission through the approval chain to process the modification request submission. For example, the approval chain for the modification request submission is based on the type of modification request being submitted and can include one or more of faculty department heads, deans of colleges, dean of graduate studies, a head and members of a scientific council and various scientific council committees, university administrators, scientific council secretary, and secretary of the scientific council.

At step 1412, once the approved request management engine 146 receives a final modification decision from the request approval engine 144, the final modification decision is output to the requester who initiated the request, and the decision data 154 stored in the data repository 114 is updated.

FIG. 15 is an exemplary screenshot of a modification request UI screen 1500. The modification request UI screen 1500 may be output by the GUI engine 150 to requesters who have received approval decisions in one or more formats, such as email, notification on webpage or electronic device request, etc. The modification request UI screen 1500 includes multiple data fields and input fields that allow the requesters to input information related to modification request submissions. For example, the GUI engine 150 outputs a modification type input field 1502 that allows the requesters to indicate the type of modification request such as modify sabbatical leave length, modify retirement date, modify research funding amount, withdraw resignation, modify publication request, etc. The data input field 1504 allows the requester to input a personal statement explaining the reason for the modification request. At data field 1506, the GUI engine 150 receives a submission selection where the requester can submit the modification request, check a status of a request, or cancel a request. The GUI engine 150 passes the modification request submission information input at the UI screen 1500 to the approved request management engine 146 for approval.

Figure 16A:
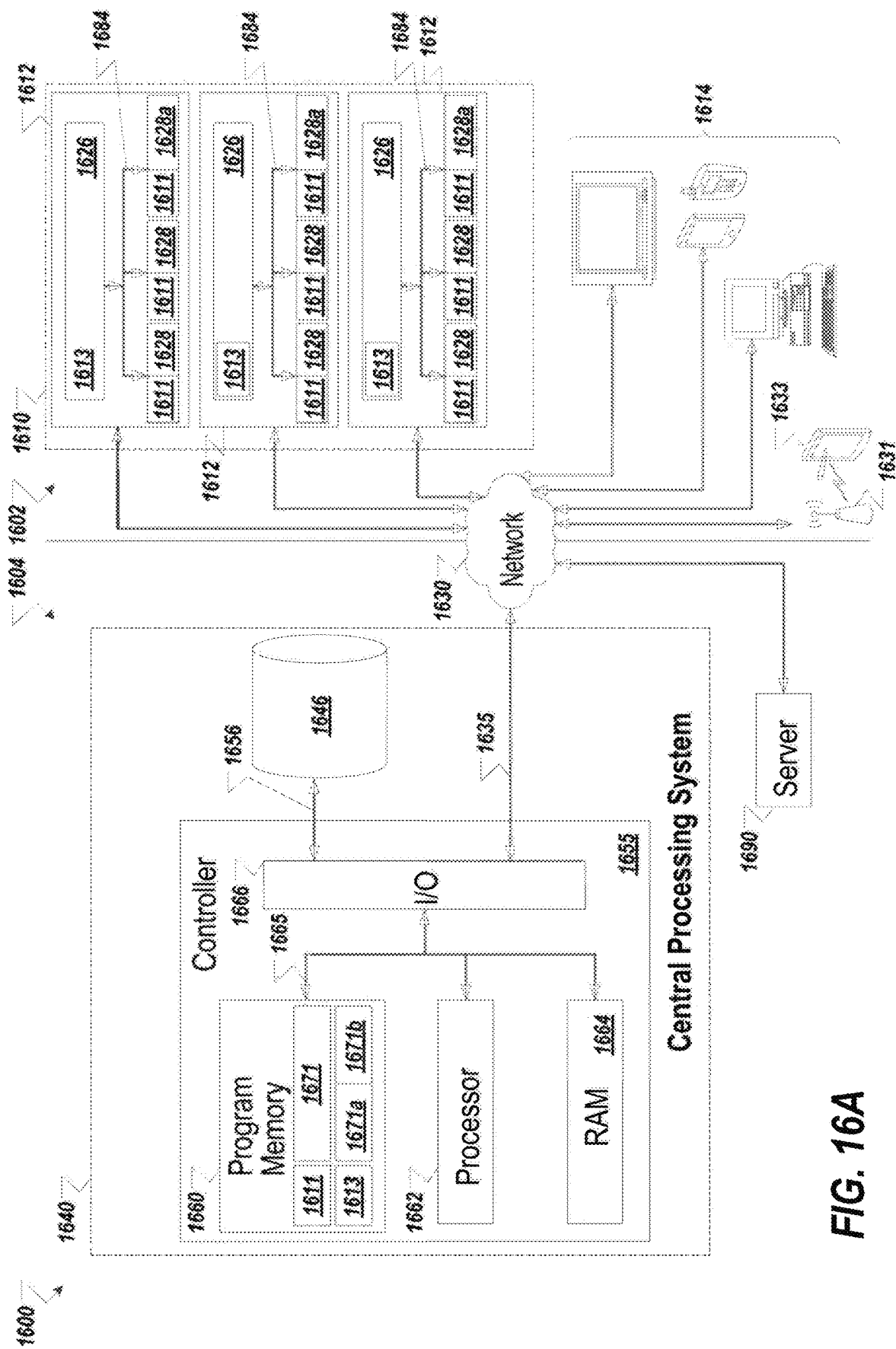
FIGS. 16A and 16B illustrate various aspects of an exemplary architecture implementing a platform for automated management of requests.
Figure 16B:
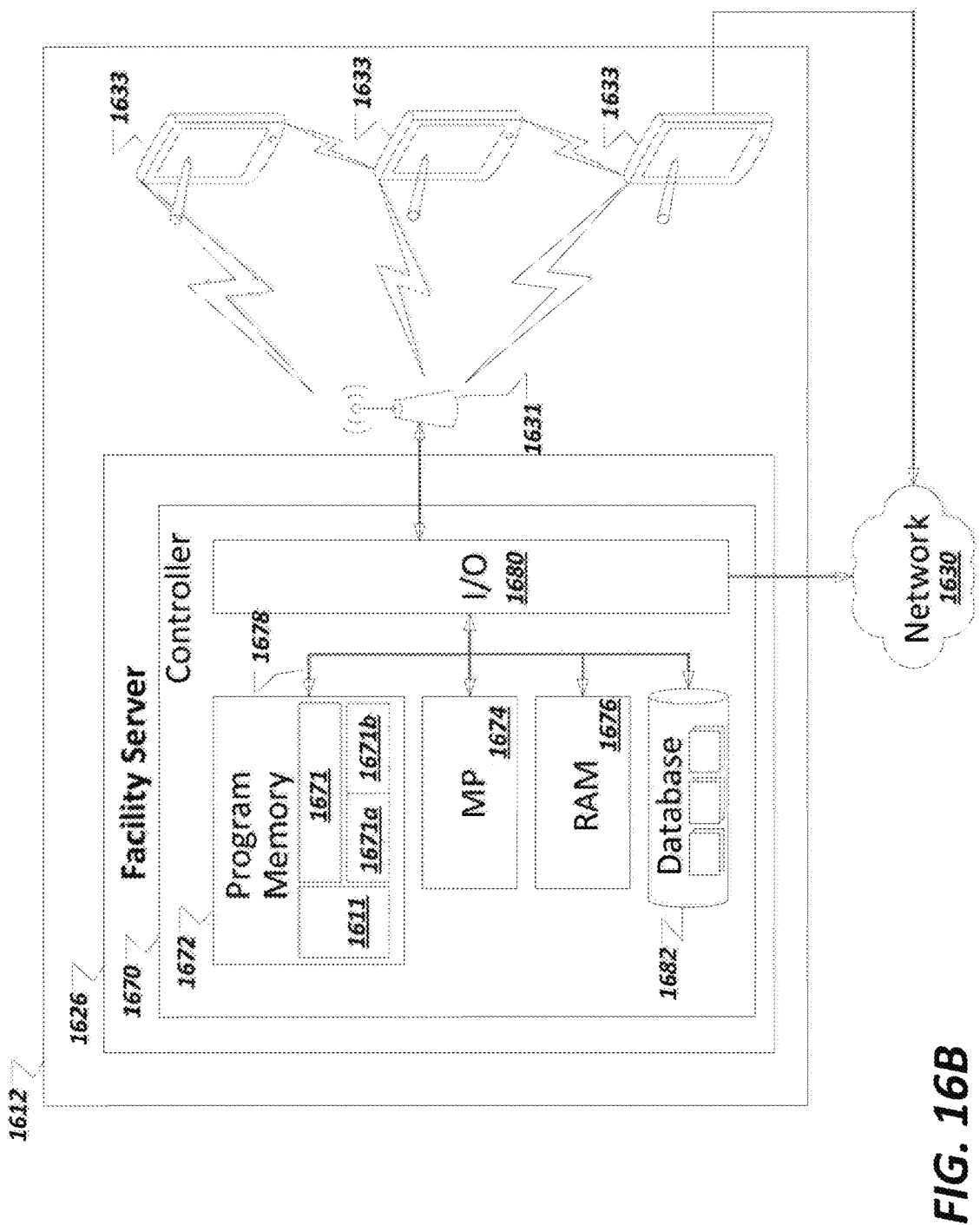

FIGS. 16A and 16B illustrate various aspects of an exemplary architecture implementing a platform 1600 for managing requests. The high-level architecture includes both hardware and software requests, as well as various data communications channels for communicating data between the various hardware and software components. The platform 1600 may be roughly divided into front-end components 1602 and back-end components 1604. The front-end components 1602 are primarily disposed within a requester network 1610 including one or more requesters 1612. The requesters 1612 may be located, by way of example rather than limitation, in separate geographic locations from each other, including different areas of the same city, different cities, different states, or even different countries. The front-end components 1602 may include a number of workstations 1628. The workstations 1628, for example, can be local computers located in the various locations 1612 throughout the network 1610 and executing various requests for ranking the approvers 104 with respect to preferences of the requesters 102.

Web-enabled devices 1614 (e.g., personal computers, tablets, cellular phones, smart phones, web-enabled televisions, etc.) may be communicatively connected to locations 1612 and the system 1640 through a digital network 1630 or a wireless router 1631, as described below.

Referring now to FIG. 16A, the front-end components 1602, in some embodiments, include a number of facility servers 1626 disposed at the number of locations 1612 instead of or in addition to, a number of workstations 1628. Each of the locations 1612 may include one or more facility servers 1626 that may facilitate communications between the web-enabled devices 1614 and the back-end components 1604 via a digital network 1630, described below, and between the terminals 1628, 1628A of the locations 1612 via the digital network 1630, and may store information for a number of requesters/approvers/accounts/etc. associated with each facility. Of course, a local digital network 1684 may also operatively connect each of the workstations 1628 to the facility server 1626. Unless otherwise indicated, any discussion of the workstations 1628 also refers to the facility servers 1626, and vice versa. Moreover, environments other than the locations 1612, such as the kiosks, call centers, and Internet interface terminals may employ the workstations 1628, the web-enabled devices 1614, and the servers 1626. As used herein, the term "location" refers to any of these points of contact (e.g., call centers, kiosks, Internet interface terminals, etc.) in addition to the locations 1612, etc. described above.

The front-end components 1602 communicate with the back-end components 1604 via the digital network 1630. One or more of the front-end components 1602 may be excluded from communication with the back-end components 1604 by configuration or by limiting access due to security concerns. For example, the web enabled devices 1614 may be excluded from direct access to the back-end components 1604. In some embodiments, the locations 1612 may communicate with the back-end components via the digital network 1630. In other embodiments, the locations 1612 and web-enabled devices 1614 may communicate with the back-end components 1604 via the same digital network 1630, but digital access rights, IP masking, and other network configurations may deny access of the web-enabled devices 1614. The web-enabled devices may also connect to the network 1630 via the encrypted, wireless router 1631.

The digital network 1630 may be a proprietary network, a secure public Internet, a virtual private network or some other type of network, such as dedicated access lines, plain ordinary telephone lines, satellite links, combinations of these, etc. Where the digital network 1630 includes the Internet, data communication may take place over the digital network 1630 via an Internet communication protocol. In addition to one or more web servers 1690 (described below), the back-end components 1604 may include a central processing system 1640 within a central processing facility. Of course, the locations 1612 may be communicatively connected to different back-end components 1604 having one or more functions or capabilities that are similar to the central processing system 1640. The central processing system 1640 may include processing circuitry (e.g., one or more computer processors) 1662 adapted and configured to execute various software requests and components of the platform 1600, in addition to other software requests, such as a medication management system.

The central processing system 1640, in some embodiments, further includes a database 1646 (which may include one or more databases). The database 1646 can be adapted to store data related to the operation of the platform 1600. The central processing system 1640 may access data stored in the database 1646 when executing various functions and tasks associated with the operation of the platform 1600.

Although the platform 1600 is shown to include a central processing system 1640 in communication with three locations 1612, and various web-enabled devices 1614 it should be understood that different numbers of processing systems, locations, and devices may be utilized. For example, the digital network 1630 (or other digital networks, not shown) may interconnect the platform 1600 to a number of included central processing systems 1640, hundreds of locations 1612, and thousands of web-enabled devices 1614. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 1612 may store data locally on the facility server 1626 and/or the workstations 1628.

FIG. 16A also depicts one possible embodiment of the central processing system 1640. The central processing system 1640 may have a controller 1655 operatively connected to the database 1646 via a link 1656 connected to an input/output (I/O) circuit 1666. It should be noted that, while not shown, additional databases may be linked to the controller 1655 in a known manner.

The controller 1655 includes a program memory 1660, the processing circuitry 1662 (may be called a microcontroller or a microprocessor), a random-access memory (RAM) 1664, and the input/output (I/O) circuit 1666, all of which are interconnected via an address/data bus 1665. It should be appreciated that although only one microprocessor 1662 is shown, the controller 1655 may include multiple microprocessors 1662. Similarly, the memory of the controller 1655 may include multiple RAMs 1664 and multiple program memories 1660. Although the I/O circuit 1666 is shown as a single block, it should be appreciated that the I/O circuit 1666 may include a number of different types of I/O circuits. The RAM(s) 1664 and the program memories 1660 may be implemented as semiconductor memories, magnetically readable memories, and/or optically readable memories, for example. A link 1635 may operatively connect the controller 1655 to the digital network 1630 through the I/O circuit 1666.

FIG. 16B depicts one possible embodiment of the front-end components 1602 located in one or more of the locations 1612 from FIG. 16A. Although the following description addresses the design of the locations 1612, it should be understood that the design of one or more of the locations 1612 may be different from the design of others of the locations 1612. Also, each of the locations 1612 may have various different structures and methods of operation. It should also be understood that while the embodiment shown in FIG. 16B illustrates some of the components and data connections that may be present in a location 1612, it does not illustrate all of the data connections that may be present in a location 1612. For exemplary purposes, one design of a location is described below, but it should be understood that numerous other designs may be utilized.

Each of the locations 1612, as illustrated, has one or more portable computing devices 1633 (e.g., notebook computers, tablet computers, smart phones, personal data assistants, etc.) and/or a facility server 1626. The digital network 1684 and wireless router 1631 operatively connect the facility server 1626 to the number of portable computing devices 1633 and/or to other web-enabled devices 1614 and workstations 1628. The digital network 1630 may be a wide area network (WAN), a local area network (LAN), or any other type of digital network readily known to those persons skilled in the art. The digital network 1630 may operatively connect the facility server 1626, the portable computing devices 1633, the workstations 1628, and/or the other web-enabled devices 1614 to the central processing system 1640.

Each portable computing device 1633, workstation 1628, requester device terminal 1628a, or facility server 1626 includes a controller 1670, as depicted in FIG. 16B in relation to the server 1626. Similar to the controller 1655 from FIG. 16A, the controller 1670 includes a program memory 1672, processing circuitry (e.g., one or more microcontrollers or microprocessors) 1674, a random-access memory (RAM) 1676, and an input/output (I/O) circuit 1680, all of which are interconnected via an address/data bus 1678. In some embodiments, the controller 1670 may also include, or otherwise be communicatively connected to, a database 1682. The database 1682 (and/or the database 1646 of FIG. 16A) includes data such as the types of data stored in the data repository 114 (FIG. 1) described previously. As discussed with reference to the controller 1655, it should be appreciated that although FIG. 16B depicts only one microprocessor 1674, the controller 1670 may include multiple microprocessors 1674. Similarly, the memory of the controller 1670 may include multiple RAMs 1676 and multiple program memories 1672. Although the FIG. 16B depicts the I/O circuit 1680 as a single block, the I/O circuit 1680 may include a number of different types of I/O circuits. The controller 1670 may implement the RAM(s) 1676 and the program memories 1672 as semiconductor memories, magnetically readable memories, and/or optically readable memories, for example.

Either or both of the program memories 1660 (FIG. 16A) and 1672 may also contain machine-readable instructions (i.e., software) 1671, for execution within the processing circuitry 1662 (FIG. 16A) and 1674, respectively. The software 1671 may perform the various tasks associated with operation of the location or locations, and may be a single module 1671 or a number of modules 1671a, 1671b. While the software 1671 is depicted in FIGS. 16A and 16B as including two modules, 1671a and 1671b, the software 1671 may include any number of modules accomplishing tasks related to location operation.

In addition to the controller 1670, the portable computing devices 1633, the workstations 1628 and the other web-enabled devices 1614 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A requester 102 or approver 104 may sign on and occupy each portable computing device 1633, workstation 1628 or requester device terminal 1628a to assist the employee in performing his or her duties. Employees may sign onto the portable computing device 1633, workstation 1628 or the requester device terminal 1628a using any available technique, such as entering a user name and password. If an employee signs on to the system using a portable computing device 1633, the network 1684 communicates this information to the facility server 1626, so that the controller 1670 may identify which employees are signed onto the platform 1600 and which portable computing device 1633, workstation 1628 or requester device terminal 1628a the employee is signed onto.

Various software requests resident in the front-end components 1602 and the back-end components 1604 implement functions related to location operation, and provide various user interface means to allow users (e.g., brokers) to access the platform 1600. One or more of the front-end components 1602 and/or the back-end components 1604 may include a user-interface request 1611 for allowing a user to input and view data associated with the platform 1600, and to interact with the platform described herein. In one embodiment, the user interface request 1611 is a web browser requester, and the facility server 1626 or the central processing system 1640 implements a server request 1613 for providing data to the user interface request 1611. However, the user interface request 1611 may be any type of interface, including a proprietary interface, and may communicate with the facility server 1626 or the central processing system 1640 using any type of protocol including, but not limited to, file transfer protocol (FTP), telnet, hypertext-transfer protocol (HTTP), etc. Moreover, some embodiments may include the user interface request 1611 running on one of the web-enabled devices 1614, while other embodiments may include the request 1611 running on the portable computing device 1633 in a location 1612. The central processing system 1640 and/or the facility server 1626 may implement any known protocol compatible with the user-interface request 1611 running on the portable computing devices 1633, the workstations 1628 and the web-enabled devices 1614 and adapted to the purpose of receiving and providing the necessary information during the data transfer process.

Figure 16C:
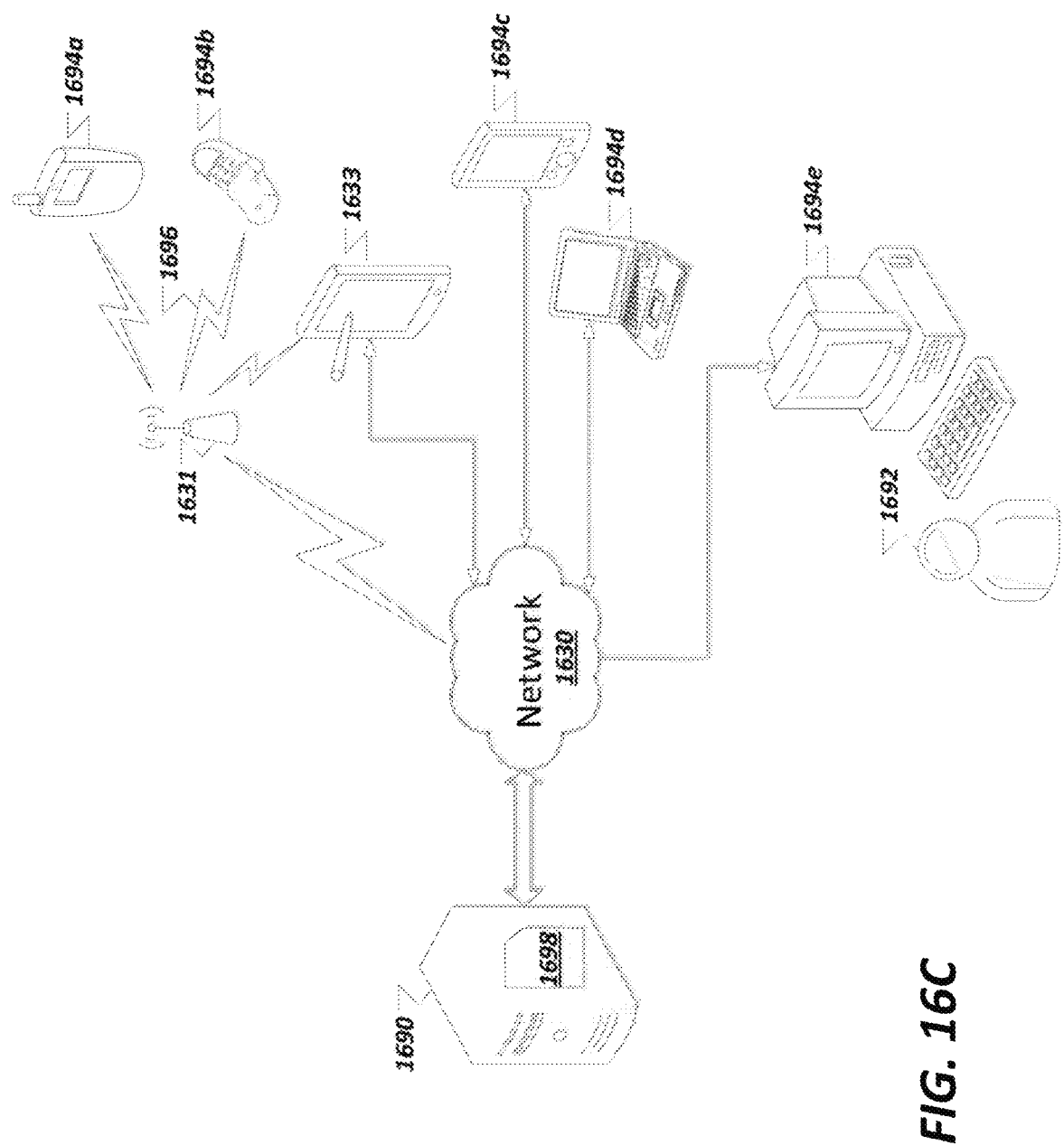
FIGS. 16C and 16D illustrate an example server interface for connecting user computing devices within a platform for automated management of requests.

For purposes of implementing the platform 1600, the user interacts with location systems (e.g., the central processing system 1640) via a number of web pages. FIG. 16C depicts a web server 1690 connected via the network 1630 to a number of portable computing devices 1633 and other web-enabled devices through which a user 1692 may initiate and interact with the platform 1600. The web enabled devices may include, by way of example, a smart-phone 1694a, a web-enabled cell phone 1694b, a tablet computer 1633, a personal digital assistant (PDA) 1694c, a laptop computer 1694d, a desktop computer 1694e, a portable media player (not shown), etc. Of course, any web-enabled device appropriately configured may interact with the platform 1600. The web-enabled devices 1633 and 1694 need not necessarily communicate with the network 1630 via a wired connection. In some instances, the web enabled devices 1633 and 1694 may communicate with the network 1630 via wireless signals 1696 and, in some instances, may communicate with the network 1630 via an intervening wireless or wired device 1631, which may be a wireless router, a wireless repeater, a base transceiver station of a mobile telephony provider, etc. Each of the web-enabled devices 1633 and 1694 may interact with the web server 1690 to receive web pages, such as the web page 1698 depicted in FIG. 16C, for display on a display associated with the web-enabled device 1633 and 1694. It will be appreciated that although only one web server 1690 is depicted in FIG. 16C, multiple web servers 1690 may be provided for the purpose of distributing server load, serving different web pages, implementing different portions of the location web interface, etc.

Figure 16D:
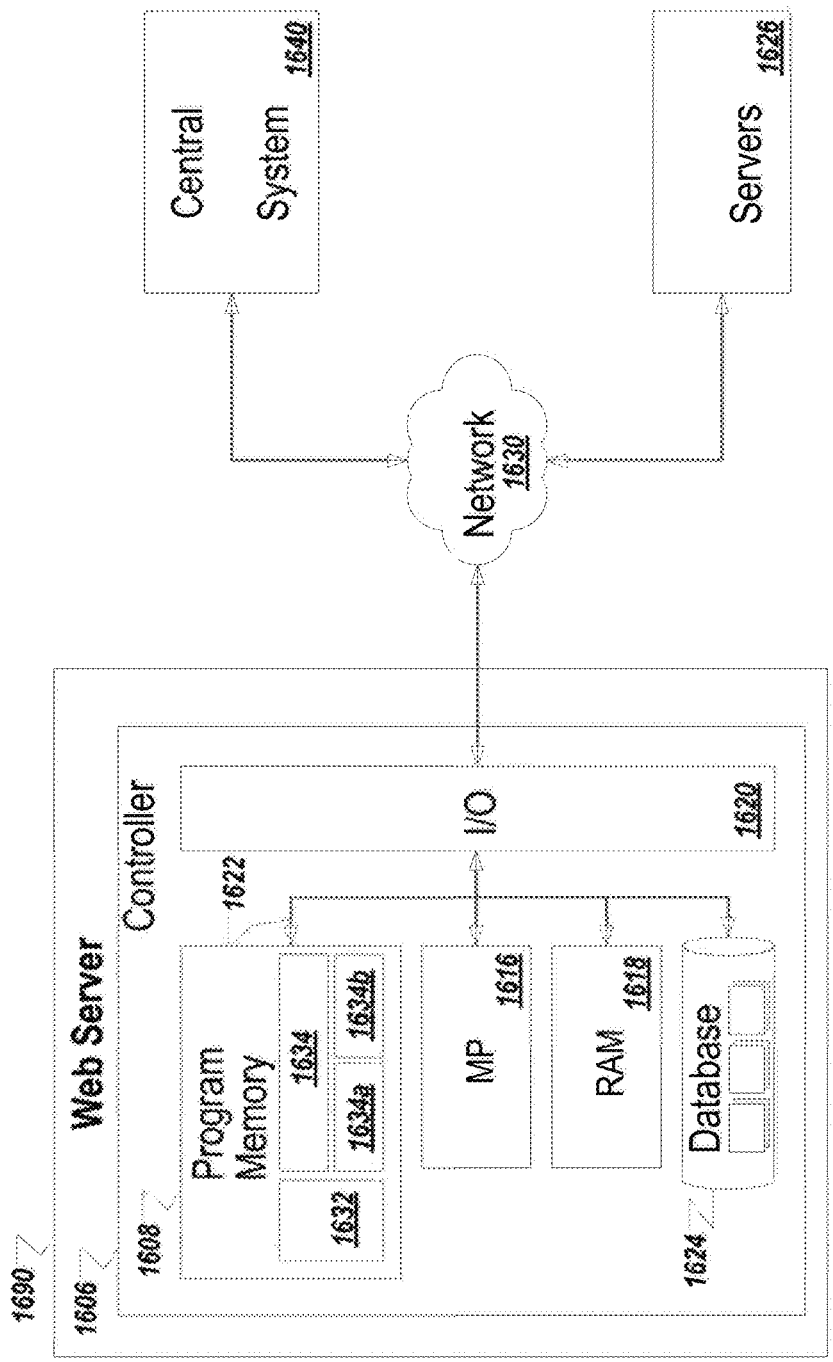

Turning now to FIG. 16D, the web server 1690, like the facility server 1626, includes a controller 1606. Similar to the controllers 1655 and 1670, the controller 1606 includes a program memory 1608, processing circuitry (e.g., one or more microcontrollers or microprocessors) 1616, a random-access memory (RAM) 1618, and an input/output (I/O) circuit 1620, all of which are interconnected via an address/data bus 1622. In some embodiments, the controller 1606 may also include, or otherwise be communicatively connected to, a database 1624 or other data storage mechanism (e.g., one or more hard disk drives, optical storage drives, solid state storage devices, etc.). The database 1624 may include data such as research institution web profiles, product data, web page templates and/or web pages, and other data necessary to interact with the user 1692 through the network 1630. As discussed with reference to the controllers 1655 and 1670, it should be appreciated that although FIG. 16I depicts only one microprocessor 1616, the controller 1606 may include multiple microprocessors 1616. Similarly, the memory of the controller 1606 may include multiple RAMs 1618 and multiple program memories 1608. Although the FIG. 16D depicts the I/O circuit 1620 as a single block, the I/O circuit 1620 may include a number of different types of I/O circuits. The controller 1606 may implement the RAM(s) 1618 and the program memories 1608 as semiconductor memories, magnetically readable memories, and/or optically readable memories, for example.

In addition to being connected through the network 1630 to the user devices 1633 and 1694, as depicted in FIG. 16C, FIG. 16D illustrates that the web server 1690 may also be connected through the network 1630 to the central processing system 1640 and/or one or more facility servers 1626. As described below, connection to the central processing system 1640 and/or to the one or more facility servers 1626 facilitates the platform 1600.

The program memory 1608 and/or the RAM 1618 may store various requests for execution by the processing circuitry 1616. For example, a request 1632 may provide a user interface to the server, which user interface may, for example, allow a network administrator to configure, troubleshoot, or test various aspects of the server's operation, or otherwise to access information thereon. A server request 1634 operates to populate and transmit web pages to the web-enabled devices 1694, receive information from the user 1692 transmitted back to the server 1690, and forward appropriate data to the central processing system 1640 and the facility servers 1626, as described below. Like the software 1671, the server request 1634 may be a single module 1634 or a number of modules 1634a, 1634b. While the server request 1634 is depicted in FIG. 16D as including two modules, 1634a and 1634b, the server request 1634 may include any number of modules accomplishing tasks related to implantation of the web server 1690. By way of example, the module 1634a may populate and transmit the web pages and/or may receive and evaluate inputs from the user 1692 to facilitate in the wireless transfer of data from a first tablet to a second tablet, while the module 1634b may communicate with one or more of the back end components to provide the requested data.

Typically, a user may launch or instantiate a user interface request (e.g., a web browser or other requester request) from a web-enabled device, such as the web-enabled devices 1633 and 1694, to access the web server 1690 cooperating with the system 1640 to implement the platform 1600.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The implementations described herein are directed to a request management system 108 that significantly improves the technology of systems and devices that manage decisions that are made for requests submitted by faculty members at a university. Being able to process requests in real-time, automatically determine a request quality score that provides an indication of whether the request should be approved, and manage the flow of requests through the approvers, the request management system 108 is fully automated and improves the efficiency of how the processing engines and data repositories interact with each other. The automatically triggering of the processing engines during execution of the processes of the request management system 108 increases the amount of processing that is done by the system 108 without any type of human interaction. Further, the ability to transmit the request attribute vector, prioritization matrix, and RQS for various requests to distributed computing resources improves the operational efficiency of the request management system 108.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A system in which a plurality of request submissions by requesters are communicated to several hundred approval members in an institution and in which approval of the request submissions is decided, the system comprising:
   one or more servers, each including
      server processing circuitry including
         a first correlation register configured to store a first vector, and
         a second correlation register configured to store a second vector, and
      a non-transitory computer readable medium coupled to the server processing
      circuitry storing machine-executable instructions for a management system, the management system configured with:
         a GUI engine,
         a request management engine,
         a prioritization matrix engine,
         a request quality score calculation engine,
         a request approval engine, and
         an approved request management engine;
   a network; and
   a plurality of requester computing devices in communication, via the network, with at least a first server of the one or more servers, each requester computing device inputting a request submission including a type of request and terms of the request;
   wherein server instructions, when executed by the server processing circuitry, cause the server processing circuitry to:
      run the prioritization matrix engine to generate, by a trigger in response to receiving the request submissions associated with requesters from the plurality of requester computing devices, a prioritization matrix including one or more entries associated with characteristics of a potential requester, characteristics of the type of request, long-term and short-term achievements of the potential requester who may be considered a good candidate for approval, and store the prioritization matrix in the first correlation register,
      run the request management engine to generate, in response to receiving the plurality of request submissions from a requester computing device of the plurality of requester computing devices, a request attribute vector by automatically extracting attributes of the request from the request submission that is stored in the second correlation register, the request attribute vector including entries associated with biographical information of the requester and achievements of the requester,
      run the request quality store (RQS) calculation engine to calculate, in real-time, an RQS for each of the submitted requests based on the respective prioritization matrix, by calculating for each RQS a product for each entry of the prioritization matrix by multiplying corresponding entries of the prioritization matrix and the request attribute vector,
      run the prioritization matrix engine to apply a weighting factor to the product for each entry of the prioritization matrix resulting in weighted products for each entry of the prioritization matrix, and
      run the request quality score calculation engine to accumulate the weighted products into a request quality score indicating an amount of correlation between the prioritization matrix and the request attribute vector,
   in response to determining by the at least one other approver network computing device that an amount of network or processing congestion of computing resources is greater than a predetermined threshold, the at least one other approver network computing device transmits a processing resource query to one or more external entity networks;
   receive, by the at least one other approver network computing device, processing capability response messages from the one or more external entity networks indicating processing capabilities of computing resources associated with the one or more external entity networks, and
   select, by the at least one other approver network computing device, an entity computing device from among the one or more external entity networks to allocate processing resources from in order to reduce processing burden,
   the selected entity computing device including computing device processing circuitry, wherein computing device instructions, when executed by the computing device processing circuitry, cause the computing device processing circuitry to:
   construct an enhanced data packet as a command to at least one other approver network computing device to perform a request routing process associated with the request approval engine, wherein the enhanced data packet condenses the request attribute vectors for the plurality of requesters for a particular type of request, the prioritization matrix for the type of request, or the request quality score for the plurality of requesters for the type of request into a single data structure,
   automatically route the enhanced data packet through an approval chain, including
      run the GUI engine to prepare, for presentation to an approval member via the selected entity computing device, an approver user interface screen for selection of a decision on the plurality of request submissions for the type of requests,
      provide, via the network to the selected entity computing device, the approver user interface screen, and
      receive, from the approval member via the approver user interface screen, the decision;
      and
   for each submitted request, run the approved request management engine to output the decision to the requester computing device that submitted the request.

2. The system of claim 1, wherein the server processing circuitry is further configured to run the request approval engine to transmit the enhanced data packet to the at least one other approver network computing device in response to determining that an amount of processing congestion of one or more computing resources of the system is greater than a predetermined threshold.

3. The system of claim 2, wherein the server processing circuitry is further configured to transmit, in response to determining that the amount of processing congestion of the one or more computing resources of the system is greater than the predetermined threshold, run the request approval engine to transmit a processing resource query to the at least one other approver network computing device.

4. The system of claim 1, wherein the server processing circuitry is further configured to run the request approval engine to select the at least one other approver network computing device for the enhanced data packet transmission that has a greatest processing capacity.

5. The system of claim 1, wherein the server processing circuitry is further configured to run the request approval engine to select the at least one other approver network computing device for the enhanced data packet transmission based on a type of processing task associated with the enhanced data packet.

6. The system of claim 1, wherein the server processing circuitry is further configured to run the request management engine to output, in response to receiving a final decision from a communication device associated with a final approver in an approval chain, the final decision to the plurality of requester computing devices associated with the requester.

7. The system of claim 1, wherein the running the prioritization matrix engine to generate the prioritization matrix includes updating a previous prioritization matrix for a corresponding type of previously submitted request based on keyword data extracted from one or more external data sources.

8. The system of claim 7, wherein the server processing circuitry is further configured to run the prioritization matrix engine to determine weighting factors for each entry of the prioritization matrix based on the keyword data extracted from the one or more external data sources.

9. The system of claim 1, wherein the server processing circuitry is further configured to run the request management engine to generate, in response to calculating the request quality score, a decision prediction indicating a probability that the request is approved.

10. The system of claim 9, wherein the run the request management engine to generate the decision prediction includes comparing the request quality score to an average request quality score for a corresponding type of previously submitted request.

11. The system of claim 1, wherein the server processing circuitry is further configured to run the request management engine to determine a routing scheme classification for each of the request submissions based on the type of request and the terms of the request of each said request submission including at least one of an individual routing scheme or a grouped routing scheme,
wherein the individual routing scheme processes the requests individually as the plurality of requests are received, and the grouped routing scheme processes the plurality of requests at predetermined time intervals.

12. The system of claim 1, wherein the server processing circuitry is further configured to run the GUI engine to provide one or more previous requests submitted by the requester and previous decision statistics for one or more types of request submissions.

13. The system of claim 1, wherein the server instructions, when executed by the server processing circuitry, further cause the server processing circuitry to:
run the GUI engine to prepare, for presentation to a user via the requester computing device, a second graphical user interface for submitting a modification request submission that includes a type of request and a statement of a reason for the modification request submission;

provide, via the network to the requester computing device, the second graphical user interface; and
receive, from the user via the second graphical user interface, the type of request and the statement of reason for the modification request submission.

14. The system of claim 13, wherein the server instructions, when executed by the server processing circuitry, further cause the server processing circuitry to:
run the approved request management engine to automatically approve the modification request submission in response to determining that the modification request submission is within predetermined decision terms.

15. The system of claim 1, wherein each of the requester computing devices configured to generate, via the GUI engine a request user interface screen for submission of, to the request management engine, historical request information of the requester for a predetermined type of request including a number of requests submitted in the past year of the same type, a number of requests submitted in the past year of all types, a number of requests submitted ever of the same type, a number of requests submitted in the past year of all types, a previous performance review score, and an average performance review score, as attributes stored in the second correlation register, and
wherein the approver user interface screen for submission of an approval decision for the predetermined type of request, the approver user interface screen including a list of requesters who have submitted the predetermined type of request along with an identification number and the corresponding request quality score that was calculated for the requester by the request quality score calculation engine, the approver user interface screen configured to allow the approval member to select a requester from the list of requesters, and in response, the GUI engine outputs a request decision field.

16. A method in which a plurality of request submissions by requesters are communicated to several hundred approval members in an institution and in which approval of the request submissions is decided, steps of the method performed by a management system configured with:
a GUI engine,
a request management engine,
a prioritization matrix engine,
a request quality score calculation engine,
a request approval engine; and
an approved request management engine,
the method comprising:
inputting, by a plurality of requester computing devices, a plurality of request submissions, each request submission including a type of request and terms of the request
generating, by the prioritization matrix engine in response to receiving the plurality of request submissions associated with requesters from a plurality of requester computing devices, a prioritization matrix including one or more entries associated with characteristics of a potential requester, characteristics the type of request, long-term and short-term achievements of the potential requester who may be considered a good candidate for approval, and store the prioritization matrix in a first correlation register;
generating, by the request management engine, a request attribute vector by automatically extracting attributes of the request from the request submission that is stored in a second correlation register in response to receiving the plurality of request submissions from a requester computing device of the plurality of requester computing devices, the request attribute vector including entries associated with biographical information of the requester and achievements of the requester;

calculating, in real-time by the request quality store (RQS) calculation engine, an RQS for each of the submitted requests based on the prioritization matrix for the type of request, by calculating for each RQS a product for each entry of the prioritization matrix by multiplying corresponding entries of the prioritization matrix and the request attribute;

applying, by the prioritization matrix engine, a weighting factor to the product for each entry of the prioritization matrix resulting in weighted products for each entry of the prioritization matrix;

accumulating, by the request quality score calculation engine, the weighted products into a request quality score indicating an amount of correlation between the prioritization matrix and the request attribute vector;

in response to determining that an amount of network or processing congestion of computing resources of the at least one other approver network computing device is greater than a predetermined threshold, transmitting a processing resource query to one or more external entity networks;

receiving processing capability response messages from the one or more external entity networks indicating processing capabilities of computing resources associated with the one or more external entity networks;

selecting an entity computing device from among the one or more external entity networks to allocate processing resources from in order to reduce processing burden on the at least one other approver network computing device;

constructing an enhanced data packet as a command to at least one other approver network computing device to perform a request routing process associated with the request approval engine, wherein the enhanced data packet condenses the request attribute vectors for the plurality of requesters for a particular type of request, the prioritization matrix for the type of request, or the request quality score for the plurality of requesters for the type of request into a single data structure;

automatically routing the enhanced data packet through an approval chain, including preparing by the GUI engine, for presentation to an approval member via the selected entity computing device, an approver user interface screen for selection of a decision on the plurality of external request submissions for the type of requests, providing, via the network to the selected entity computing device, the approver user interface screen, and receiving, from the approval member via the approver user interface screen, the decision; and outputting, via the approved request management engine, for each submitted request, the decision to the requester computing device that submitted the request.

17. A non-transitory computer readable medium having instructions stored thereon, wherein the instructions, when executed by processing circuitry in a system in which a plurality of request submissions by requesters are communicated to several hundred approval members in an institution and in which approval of the request submissions is decided, being part of a management system configured with:

a GUI engine,
a request management engine,
a prioritization matrix engine,
a request quality score calculation engine,
a request approval engine;
an approved request management engine; and
a plurality of requester computing device devices in communication, via a network, with at least a first server of the one or more servers, each requester computing device inputting a request submission including a type of request and terms of the request, cause the processing circuitry to:

run the prioritization matrix to generate, by a trigger in response to receiving the request submissions associated with requesters from the plurality of requester computing devices, a prioritization matrix including one or more entries associated with characteristics of a potential requester, characteristics of the type of request, long-term and short-term achievements of the potential requester who may be considered a good candidate for approval, and store the prioritization matrix a first correlation register;

run the requester management engine to generate, in response to receiving the plurality of request submissions from a requester computing device of the plurality of requester computing devices, a request attribute vector by automatically extracting attributes of the request from the request submission that is stored in a second correlation register, the request attribute vector including entries associated with biographical information of the requester and achievements of the requester;

run the request quality store (RQS) calculation engine to calculate, in real-time, an RQS for each of the submitted requests based on the respective prioritization matrix, by calculating for each RQS a product for each entry of the prioritization matrix by multiplying corresponding entries of the prioritization matrix and the request attribute vector;

run the prioritization matrix engine to apply a weighting factor to the product for each entry of the prioritization matrix resulting in weighted products for each entry of the prioritization matrix; and run the request quality score calculation engine to accumulate the weighted products into a request quality score indicating an amount of correlation between the prioritization matrix and the request attribute vector;

in response to determining that an amount of network or processing congestion of computing resources of the at least one other approver network computing device is greater than a predetermined threshold, transmit a processing resource query to one or more external entity networks;

receive processing capability response messages from the one or more external entity networks indicating processing capabilities of computing resources associated with the one or more external entity networks; and select an entity computing device from among the one or more external entity networks to allocate processing resources from in order to reduce processing burden on the at least one other approver network computing device, the selected entity computing device including computing device processing circuitry, wherein computing device instructions, when executed by the computing device processing circuitry, cause the computing device processing circuitry to:

construct an enhanced data packet as a command to at least one other approver network computing device to perform a request routing process associated with the request approval engine, wherein the enhanced data packet condenses the request attribute vectors for the plurality of requesters for a particular type of request, the prioritization matrix for the type of request, or the request quality score for the plurality of requesters for the type of request into a single data structure, automatically route the enhanced data packet through an approval chain, including running the GUI engine to prepare, for presentation to an approval member via the selected entity computing device, an approver user interface screen for selection of a decision on the plurality of request submissions for the type of requests, provide, via the network to the selected entity computing device, the approver user interface screen, and receive, from the approval member via the approver user interface screen, the decision;

and for each submitted request, run the approved request management engine to output the decision to the requester computing device that submitted the request.

* * * * *